(12) United States Patent
Pennecot et al.

(10) Patent No.: US 9,910,139 B2
(45) Date of Patent: Mar. 6, 2018

(54) METHODS AND SYSTEMS FOR LIDAR OPTICS ALIGNMENT

(71) Applicant: Waymo LLC, Mountain View, CA (US)

(72) Inventors: Gaetan Pennecot, San Francisco, CA (US); Pierre-yves Droz, Los Altos, CA (US)

(73) Assignee: WAYMO LLC, Mountain View, CA (US)

( * ) Notice: Subject to any disclaimer, the term of this patent is extended or adjusted under 35 U.S.C. 154(b) by 0 days.

(21) Appl. No.: 15/482,722

(22) Filed: Apr. 8, 2017

(65) Prior Publication Data

US 2017/0212229 A1    Jul. 27, 2017

Related U.S. Application Data

(63) Continuation of application No. 14/671,085, filed on Mar. 27, 2015, now Pat. No. 9,651,658.

(51) Int. Cl.
| | |
|---|---|
| *G01S 7/497* | (2006.01) |
| *G01S 17/89* | (2006.01) |
| *G01S 7/481* | (2006.01) |
| *G02B 27/62* | (2006.01) |
| *G02B 5/20* | (2006.01) |

(52) U.S. Cl.
CPC .......... *G01S 7/4972* (2013.01); *G01S 7/4815* (2013.01); *G01S 17/89* (2013.01); *G02B 27/62* (2013.01); *G02B 5/20* (2013.01)

(58) Field of Classification Search
CPC .................................. G01B 11/26; G01C 1/00
See application file for complete search history.

(56) References Cited

U.S. PATENT DOCUMENTS

| | | | |
|---|---|---|---|
| 4,889,425 | A | 12/1989 | Edwards et al. |
| 5,872,626 | A | 2/1999 | Lipscomb |

(Continued)

FOREIGN PATENT DOCUMENTS

| | | |
|---|---|---|
| CN | 101551451 A | 10/2009 |
| EP | 2527866 A1 | 11/2012 |

OTHER PUBLICATIONS

International Search Report and Written Opinion of corresponding International Application No. PCT/US2016/023125 (dated Jun. 15, 2016).

*Primary Examiner* — Luke D Ratcliffe
(74) *Attorney, Agent, or Firm* — McDonnell Boehnen Hulbert & Berghoff LLP

(57) ABSTRACT

A method is provided that involves mounting a transmit block and a receive block in a LIDAR device to provide a relative position between the transmit block and the receive block. The method also involves locating a camera at a given position at which the camera can image light beams emitted by the transmit block and can image the receive block. The method also involves obtaining, using the camera, a first image indicative of light source positions of one or more light sources in the transmit block and a second image indicative of detector positions of one or more detectors in the receive block. The method also involves determining at least one offset based on the first image and the second image. The method also involves adjusting the relative position between the transmit block and the receive block based at least in part on the at least one offset.

20 Claims, 23 Drawing Sheets

(56) References Cited

U.S. PATENT DOCUMENTS

| | | |
|---|---|---|
| 6,788,855 B2 | 9/2004 | Massey et al. |
| 7,064,817 B1 * | 6/2006 | Schmitt ................ G01S 7/4972 356/139.01 |
| 8,400,619 B1 | 3/2013 | Bachrach et al. |
| 2010/0157280 A1 * | 6/2010 | Kusevic ................ G01S 17/89 356/4.01 |
| 2012/0081544 A1 | 4/2012 | Wee |
| 2013/0135604 A1 | 5/2013 | Gogolla et al. |

* cited by examiner

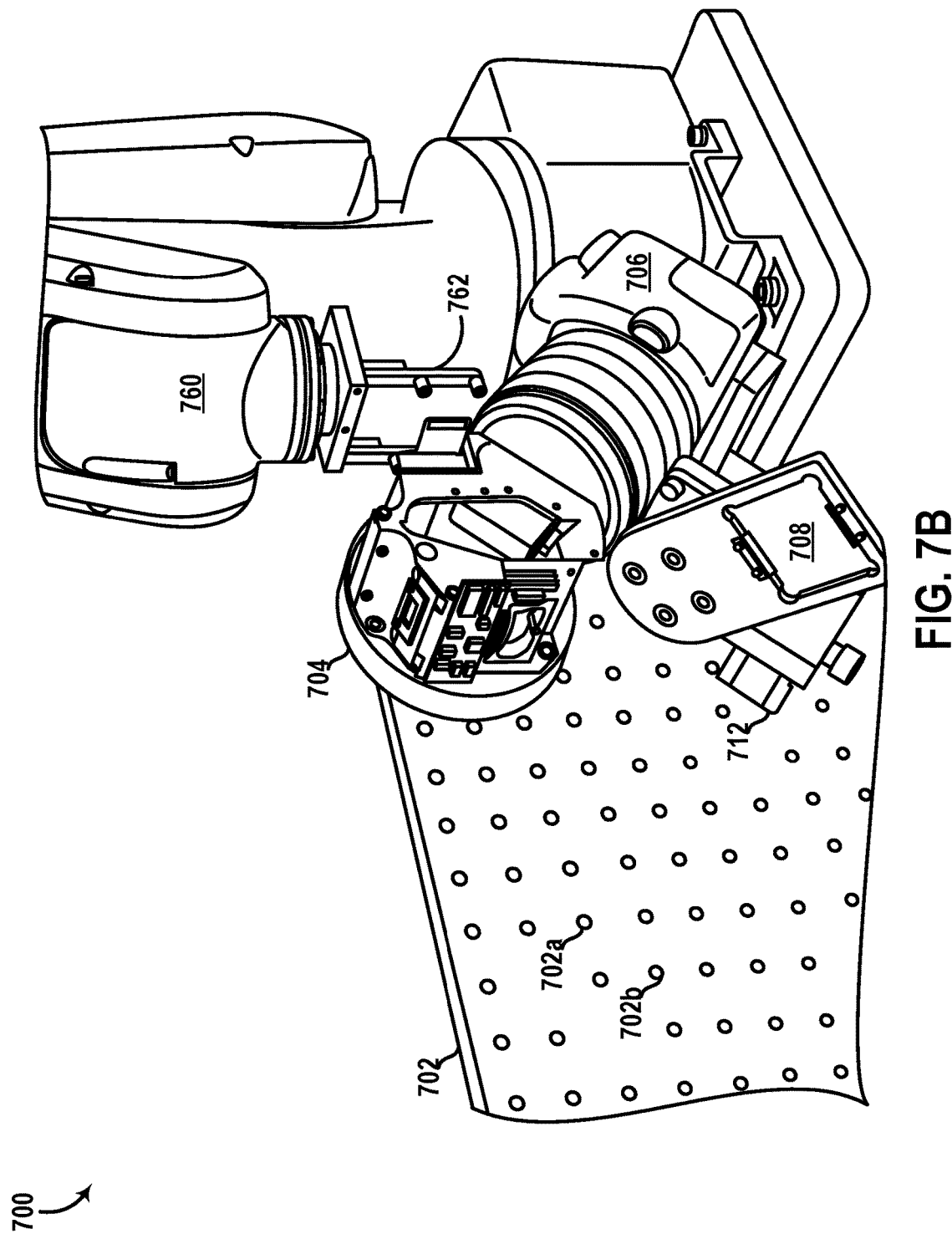

METHODS AND SYSTEMS FOR LIDAR OPTICS ALIGNMENT

CROSS REFERENCE TO RELATED APPLICATION

This application is a continuation of U.S. patent application Ser. No. 14/671,085, filed Mar. 27, 2015, the contents of which are entirely incorporated herein by reference as if fully set forth in this application.

BACKGROUND

Unless otherwise indicated herein, the materials described in this section are not prior art to the claims in this application and are not admitted to be prior art by inclusion in this section.

A LIDAR can estimate distance to environmental features while scanning through a scene to assemble a "point cloud" indicative of reflective surfaces in the environment. Individual points in the point cloud can be determined by transmitting a laser pulse and detecting a returning pulse, if any, reflected from an object in the environment, and determining the distance to the object according to the time delay between the transmission of the transmitted pulse and the reception of the reflected pulse. A laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. In this way, a three-dimensional map of points indicative of locations of reflective features in the environment can be generated for the entire scanning zone.

SUMMARY

In one example, a method is provided that involves mounting a transmit block and a receive block in a light detection and ranging (LIDAR) device to provide a relative position between the transmit block and the receive block. The transmit block may include one or more light sources configured to emit light at a source wavelength. The receive block may include one or more detectors configured to detect light at the source wavelength. The method further involves locating a camera at a given position at which the camera, when focused at infinity, can image light beams emitted by the one or more light sources and can image the one or more detectors. The method further involves obtaining a first image using the camera located at the given position and focused at infinity. The first image may be indicative of light source positions of the one or more light sources. The method further involves obtaining a second image using the camera located at the given position and focused at infinity. The second image may be indicative of detector positions of the one or more detectors in the receive block. The method further involves determining at least one offset based on the light source positions indicated by the first image and the detector positions indicated by the second image. The method further involves adjusting the relative position between the transmit block and the receive block based at least in part on the at least one offset.

In another example, a system is provided that includes a mounting platform to mount a light detection and ranging (LIDAR) device that provides a relative position between a transmit block in the LIDAR device and a receive block in the LIDAR device. The transmit block may include one or more light sources configured to emit light at a source wavelength. The receive block may include one or more detectors configured to detect light at the source wavelength. The system also includes a camera located at a given position at which the camera, when focused at infinity, can image light beams emitted by the one or more light sources and can image the one or more detectors. The system also includes an alignment apparatus configured to adjust the relative position between the transmit block and the receive block. The system also includes a controller configured to obtain a first image from the camera located at the given position and focused at infinity. The first image may be indicative of light source positions of the one or more light sources. The controller is also configured to obtain a second image from the camera located at the given position and focused at infinity. The second image may be indicative of detector positions of the one or more detectors in the receive block. The controller is also configured to determine at least one offset based on the light source positions indicated by the first image and the detector positions indicated by the second image. The controller is also configured to cause the alignment apparatus to adjust the relative position between the transmit block and the receive block based at least in part on the at least one offset.

In yet another example, a system is provided that includes a means for mounting a transmit block and a receive block in a light detection and ranging (LIDAR) device to provide a relative position between the transmit block and the receive block. The transmit block may include one or more light sources configured to emit light at a source wavelength. The receive block may include one or more detectors configured to detect light at the source wavelength. The system also comprises means for locating a camera at a given position at which the camera, when focused at infinity, can image light beams emitted by the one or more light sources and can image the one or more detectors. The system also comprises means for obtaining a first image using the camera located at the given position and focused at infinity. The first image may be indicative of light source positions of the one or more light sources. The system also comprises means for obtaining a second image using the camera located at the given position and focused at infinity. The second image may be indicative of detector positions of the one or more detectors in the receive block. The system also comprises means for determining at least one offset based on the light source positions indicated by the first image and the detector positions indicated by the second image. The system also comprises means for adjusting the relative position between the transmit block and the receive block based at least in part on the at least one offset.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 7B illustrates an arrangement of the system shown in FIG. 7A where the light filter is not interposed between the LIDAR device and the camera.

DETAILED DESCRIPTION

The following detailed description describes various features and functions of the disclosed systems, devices and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

Within examples, a LIDAR device may include a transmit block and a receive block. The transmit block may include one or more light sources that transmit light for propagation away from the LIDAR device toward an environment of the LIDAR device. In turn, the transmitted light may reflect off one or more objects in the environment, and the reflected light may propagate back toward the LIDAR device. Further, the receive block may include one or more detectors to detect the reflected light. Through this process, a computing system may process data from the LIDAR device pertaining to the reflected light to determine positions and/or characteristics of various objects in the environment of the LIDAR device.

To facilitate operation of the LIDAR device, a light beam emitted by a given light source and reflected back toward the LIDAR device is received by a corresponding detector. Within examples, systems and methods are provided for alignment of light source(s) and detector(s) in a LIDAR device.

Figure 1:
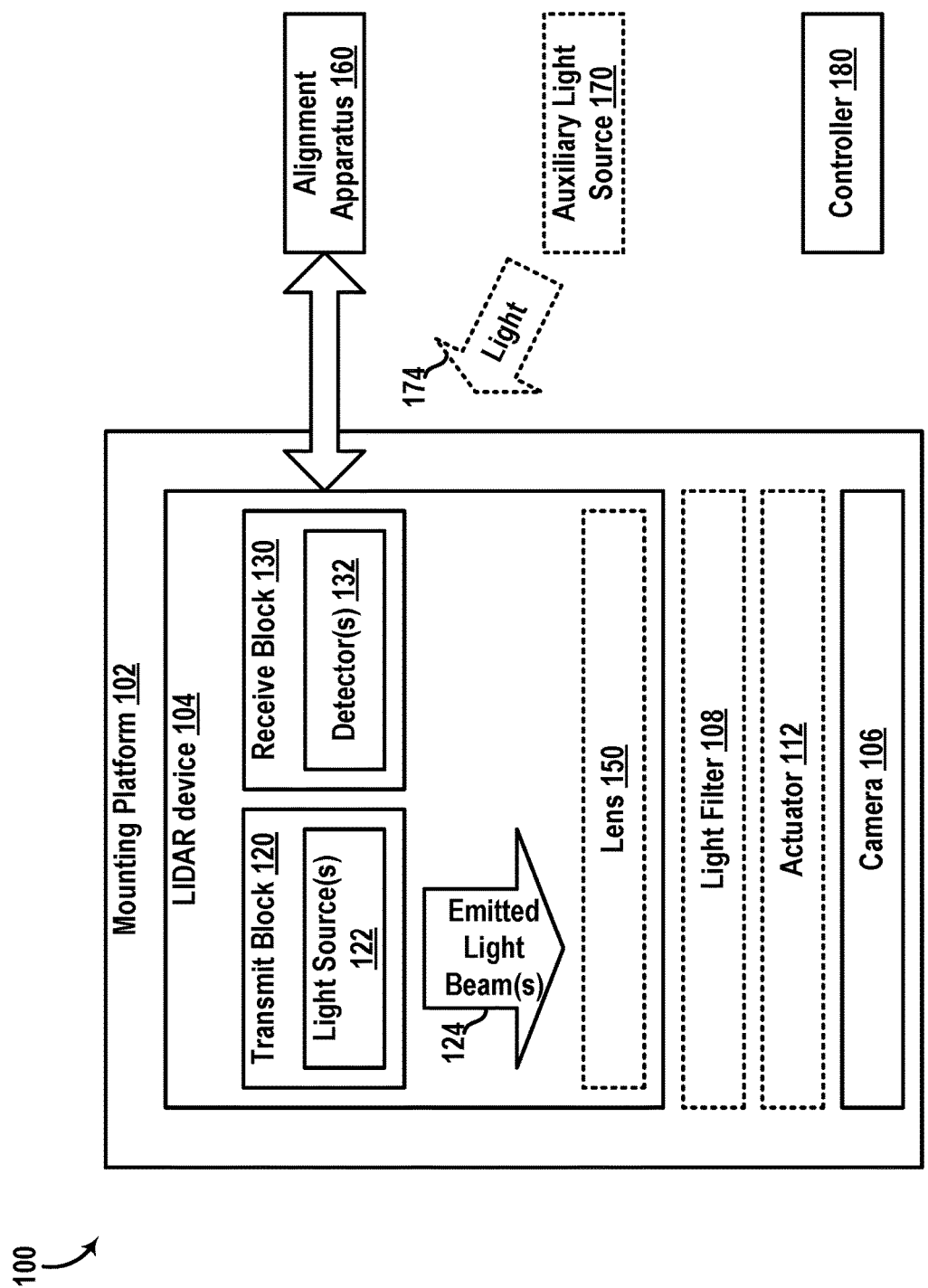
FIG. 1 is a block diagram of a system, according to an example embodiment.

FIG. 1 is a block diagram of a system 100, according to an example embodiment. The system 100 includes a mounting platform 102, an alignment apparatus 160, and a controller 180. The system 100 may optionally include an auxiliary light source 170.

The mounting platform 102 may provide a platform for mounting some or all of the components of the system 100. As shown, the mounting platform 102 mounts a LIDAR device 104 and a camera 106. In some examples, the mounting platform 102 may also mount a light filter 108. Further, in some examples, the mounting platform 102 may also mount an actuator 112. Accordingly, the mounting platform 102 may be formed from one or more solid materials suitable for supporting the various components, such as plastics or metals among other possibilities. In some examples, some of the components shown to be mounted on the mounting platform 102 may alternatively be mounted to a separate structure (not shown) or otherwise coupled to the system 100. For instance, the camera 106 and/or the light filter 108 may be alternatively positioned and/or mounted outside the mounting platform 102.

The LIDAR device 104 includes a transmit block 120 and a receive block 130. As shown, in some examples, the LIDAR device 104 may optionally include a lens 150.

The transmit block 120 includes one or more light sources 122 that may be configured to emit one or more light beams 124. Although not shown in FIG. 1, the transmit block 120 may include additional components such as a mirror or an exit aperture to condition and/or redirect the light beams 124. The one or more light sources 122 may include laser diodes, light emitting diodes (LEDs), vertical cavity surface emitting lasers (VCSEL), organic light emitting diodes (OLEDs), polymer light emitting diodes (PLED), light emitting polymers (LEP), liquid crystal displays (LCD), microelectromechanical systems (MEMS), or any other device configured to selectively transmit, reflect, and/or emit light beams 124 at a source wavelength. The source wavelength, for example, may include ultraviolet, visible, and/or infrared portions of the electromagnetic spectrum. In one embodiment, the source wavelength is 905 nm. Additionally, in some examples, the light sources 122 may be configured to emit the light beam(s) 124 in the form of pulses. In some examples, the light sources 122 may be disposed on one or more substrates (e.g., printed circuit boards (PCB), flexible PCBs, etc.).

The receive block 130 includes one or more detectors 132 that may be configured to receive light from an environment of the LIDAR device 104. In one example, a given detector of the detectors 132 is configured and arranged to receive a given light beam of the light beams 124 that is reflected off an object in the environment of the LIDAR device 104 toward the given detector. Through this process, for example, the LIDAR device 104 may detect various objects in the environment by emitting light beams 124 using the light sources 122 and detecting reflections of the light beams 124 using the detectors 132. Although not shown, in some examples, the receive block 130 may include additional components such as an inert gas, an entrance aperture (e.g., half-mirror), and/or any other component to filter and/or condition light propagating toward the detectors 132. The detector(s) 132 may comprise photodiodes, avalanche photodiodes, phototransistors, cameras, active pixel sensors (APS), charge coupled devices (CCD), cryogenic detectors, or any other sensor of light. In one embodiment, the detector(s) 132 may be configured to detect light at the source wavelength (e.g., 905 nm, etc.) of the light beams 124 emitted by the light sources 122 and/or reflections thereof.

The lens 150 may be optionally included in the LIDAR device 104 and may be configured to collimate the emitted light beams 124 and/or focus light propagating toward the detectors 132. In one embodiment, the lens 150 may be a single lens having an optical power to both collimate the light beams 124 and focus light onto the detectors 132. In another embodiment, the lens 150 may include two separate lenses. For example, a first lens may collimate the light beam(s) 124 emitted by the light source(s) 122, and a second lens may focus light propagating toward the LIDAR device 104 onto the detector(s) 132. Other lens configurations are possible as well (e.g., multiple lenses for collimation and/or multiple lenses for focus, etc.).

In some examples, the LIDAR device 104 may include additional, fewer, or different components than those shown in FIG. 1. Thus, in some embodiments, the system 100 may be utilized for assembly, manufacture, and/or calibration of various LIDAR devices having various configurations, such as the LIDAR device 104 or any other LIDAR device. Accordingly, in some examples, the LIDAR device 104 may be removably mounted to the mounting platform 102 of the system 100 to facilitate such calibration or assembly.

In some examples, the various components of the LIDAR device 104 such as the transmit block 120, receive block 130, and the lens 150 can be removably mounted in predetermined positions within the LIDAR device 104 to reduce burden of calibrating the arrangement of each component and/or subcomponents included in each component. In these examples, the system 100 may adjust the relative position between the transmit block 120 and the receive block 130 to align the one or more light sources 122 with the one or more detectors 132. Alternatively, in other examples, the system 100 may be configured to adjust the relative position between each of the subcomponents (e.g., each light source of light sources 122, each detector of detectors 132, etc.).

The camera 106 may be any camera (e.g., a still camera, a video camera, etc.) configured to capture images of the LIDAR device 104. In some examples, the camera 106 may be located at a given position at which the camera 106 can image the light beams 124 emitted by the one or more light sources 122, and can image the one or more detectors 132. In one embodiment, the camera may be focused at infinity when capturing such images. By way of example, the camera may be mounted to have a field-of-view along the path of the light beams 124 (e.g., facing the lens 150, etc.).

As an example scenario for operation of the camera 106, the LIDAR device 104 may then be configured to cause the light sources 122 to emit the light beams 124 toward the camera 106. In turn, the camera 106 may provide a first image of the light beams 124. The first image, for instance, may indicate light source position(s) (e.g., bright pixels in the first image, etc.) of the light source(s) 122. In the scenario, the camera may also obtain a second image indicative of detector position(s) of the detector(s) 132. Other scenarios are possible as well and are described in greater detail within exemplary embodiments herein.

The light filter 108 may be optionally included in the system 100 to facilitate capture and/or processing of the images described above. For instance, the light filter 108 may be positioned along a path of the light beams 124 between the LIDAR device 104 and the camera 106. In one example, the light filter 108 may be configured to attenuate light within a wavelength range that includes the source wavelength of the light source(s) 122. In this example, the attenuation of the light may facilitate contrasting pixels in the first image that are associated with the light beams 124 against surrounding pixels. Further, in this example, the attenuation of the light may protect the camera 106 from the intensity of the light beams 124. In another example, the light filter 108 may be configured to attenuate light within another wavelength range that does not include the source wavelength of the light source(s) 122. In this example, the images obtained by the camera 106 may represent features of interest (e.g., light source(s) 122, detector(s) 132, etc.) in the LIDAR device 104 more clearly due to the light filter 108 attenuating background light having other wavelengths. Other configurations of the light filter 108 are possible as well and are described in greater detail within exemplary embodiments herein.

The actuator 112 may be optionally included in the system 100. The actuator 112 may be configured to adjust the position of the light filter 108. For instance, the actuator 112 may be configured to actuate the light filter 108 to a first position where the light filter 108 is interposed between the LIDAR device 104 and the camera 106, or to a second position where the light filter 108 is not interposed between the LIDAR device 104 and the camera 106. Example actuators may include motors, stepper motors, pneumatic actuators, hydraulic pistons, relays, solenoids, and piezoelectric actuators among other possibilities.

The alignment apparatus 160 may include any device that couples to one or more of the components in the LIDAR device 104 to adjust the relative position between the transmit block 120 and the receive block 130. By way of example, the alignment apparatus 160 may be a robotic arm that physically couples to the receive block 130 to rotate and/or translate the position of the receive block 130 in the LIDAR 104. Alternatively or additionally, for example, the robotic arm may adjust the position of the transmit block 120. In some examples, the alignment apparatus 160 may adjust the relative position between the transmit block 120 and the receive block 130 based on image(s) obtained by the camera 106. For instance, the alignment apparatus 160 may adjust the relative position to align one or more of the light beams 124 emitted by the light sources 122 with one or more of the detectors 132.

The system 100 may optionally include an auxiliary light source 170 that emits light 174 at the source wavelength to illuminate the receive block 130. The structure and form of the auxiliary light source 170 (e.g., LED, etc.) may be similar to the light sources 122. In one example, where the camera 106 is configured to capture images when focused at infinity for the source wavelength the light sources 122, the auxiliary light source 170 may illuminate the detectors 132 to facilitate the camera 106 obtaining the second image of the detectors 132 while also focused at infinity for the same source wavelength.

In some examples, the light filter 108 may be configured to remain interposed between the camera 106 and the LIDAR device 104 during capture of the first image (e.g., of the light beams 124) and during capture of the second image (e.g., of the detectors 132). In these examples, the illuminating light 174 from the auxiliary light source 170 may allow the camera 106 to capture an image of the detectors 132 while the light filter 108 is interposed.

In other examples, the system 100 may be configured to move the light filter 108 to another position other than the position between the camera 106 and the LIDAR device 104 prior to the camera 106 obtaining the second image of the detectors 132. For instance, the light filter 108 may be moved by the actuator 112. In these examples, the camera 106 may rely on background light to obtain the second image of the detectors 132, or the system 100 may utilize the auxiliary light source 170 to illuminate the receive block 130.

The controller 180 may include one or more processors configured to operate some or all of the components of the system 100 in line with the discussion above. To that end, the controller 180 may be coupled to the various components via a wired or wireless interface (not shown). In some examples, the controller 180 may execute program functions stored in a computer readable medium (not shown) to cause the system 100 to perform various functions and processes of the present method.

In a first example, the controller 180 may cause a power source (not shown) to provide power to the various components of the system 100. In a second example, the controller 180 may cause the transmit block 120 of the LIDAR device 104 to emit the light beams 124. In a third example, the controller 180 may operate an actuator (not shown) to position the light filter 108 between the LIDAR device 104 and the camera 106, or to position the light filter 108 at any other position. In a third example, the controller 180 may operate the camera 106 to obtain the first image (e.g., of the light beams 124) and the second image (e.g., of the detectors 132) in line with the discussion above. In a fourth example, the controller 180 may operate the alignment apparatus 160 to adjust the relative position between the transmit block 120 and the receive block 130. In a fifth example, the controller 180 may operate the alignment apparatus 160 to mount (or unmounts) various components (e.g., LIDAR device 104, etc.) to the mounting platform 102. In a sixth example, the controller 180 may operate the auxiliary light source 170 to illuminate the receive block 130 with light 174. In a seventh example, the controller 180 may operate the actuator 112 to move the light filter 108. Other examples are possible as well and are described in greater detail within exemplary embodiments herein.

The system 100 may include additional, fewer, or different components than those shown, and may perform other functions as well. In one example, the system 100 may include a display (not shown) for displaying image(s) obtained using the camera 106. For instance, the display may have a graphical user interface (GUI) for displaying and/or interacting with images captured by the camera 106, and a human operator or a computer operator may interact with the GUI to adjust the relative position between the transmit block 120 and the receive block 130 by manipulating the images in the GUI. Other procedures are possible as well for controlling the system 100 in accordance with the present disclosure.

Figure 2A:
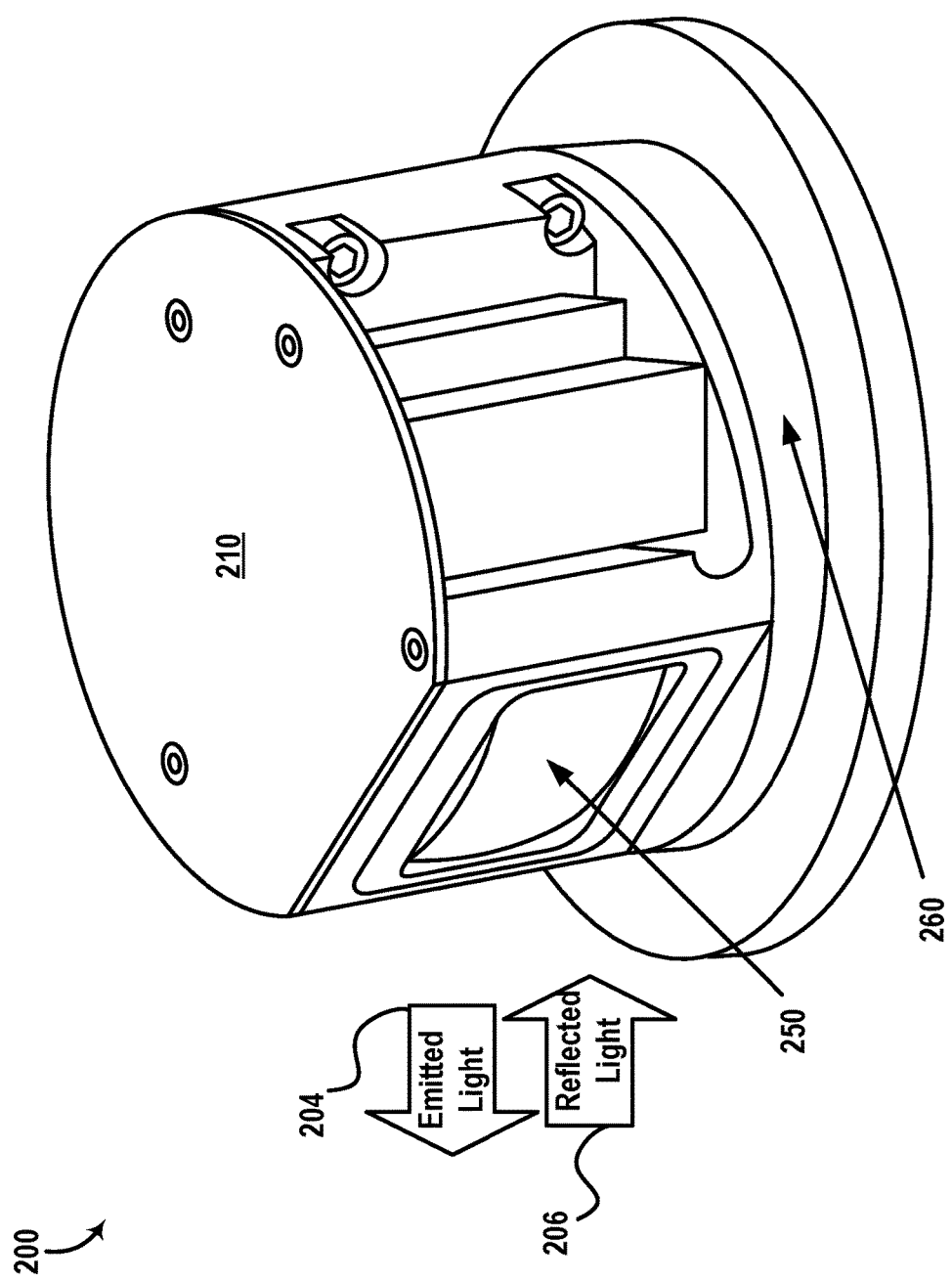
FIG. 2A illustrates a LIDAR device, according to an example embodiment.

FIG. 2A illustrates a LIDAR device 200, according to an example embodiment. The LIDAR 200 illustrates an example LIDAR device that can be used with a system such as the system 100. For instance, the LIDAR device 200 may be similar to the LIDAR device 104 of the system 100, and may be similarly mounted to the mounting platform 104 to adjust the relative position between light sources and detectors of the LIDAR 200.

As shown, the LIDAR device 200 includes a housing 210 and a lens 250. Additionally, light beams 204 emitted by the first LIDAR device 200 propagate from the lens 250 along a viewing direction of the first LIDAR 200 toward an environment of the LIDAR device 200, and reflect off one or more objects in the environment as reflected light 206.

The housing 210 included in the LIDAR device 200 can provide a platform for mounting the various components included in the LIDAR device 200. The housing 210 can be formed from any material capable of supporting the various components of the LIDAR device 200 included in an interior space of the housing 210. For example, the housing 210 may be formed from a solid material such as plastic or metal among other possibilities.

In some examples, the housing 210 can be configured to have a substantially cylindrical shape and to rotate about an axis of the LIDAR device 200. For example, the housing 210 can have the substantially cylindrical shape with a diameter of approximately 10 centimeters. In some examples, the axis is substantially vertical. By rotating the housing 210 that includes the various components, in some examples, a three-dimensional map of a 360-degree view of the environment of the LIDAR device 200 can be determined without frequent recalibration of the arrangement of the various components of the LIDAR device 200. Additionally or alternatively, in some examples, the LIDAR device 200 can be configured to tilt the axis of rotation of the housing 210 to control the field of view of the LIDAR device 200.

The lens 250 mounted to the housing 210 can have an optical power to both collimate the emitted light beams 204, and focus the reflected light 205 from one or more objects in the environment of the LIDAR device 200 onto detectors in the LIDAR device 200. In one example, the lens 250 has a focal length of approximately 120 mm. By using the same lens 250 to perform both of these functions, instead of a transmit lens for collimating and a receive lens for focusing, advantages with respect to size, cost, and/or complexity can be provided.

The LIDAR device 200 can be mounted on a mounting structure 260 that rotates about an axis to provide a 360-degree view of the environment surrounding the LIDAR device 200. In some examples, the mounting structure 260 may comprise a movable platform that may tilt in one or more directions to change the axis of rotation of the LIDAR device 200.

Figure 2B:
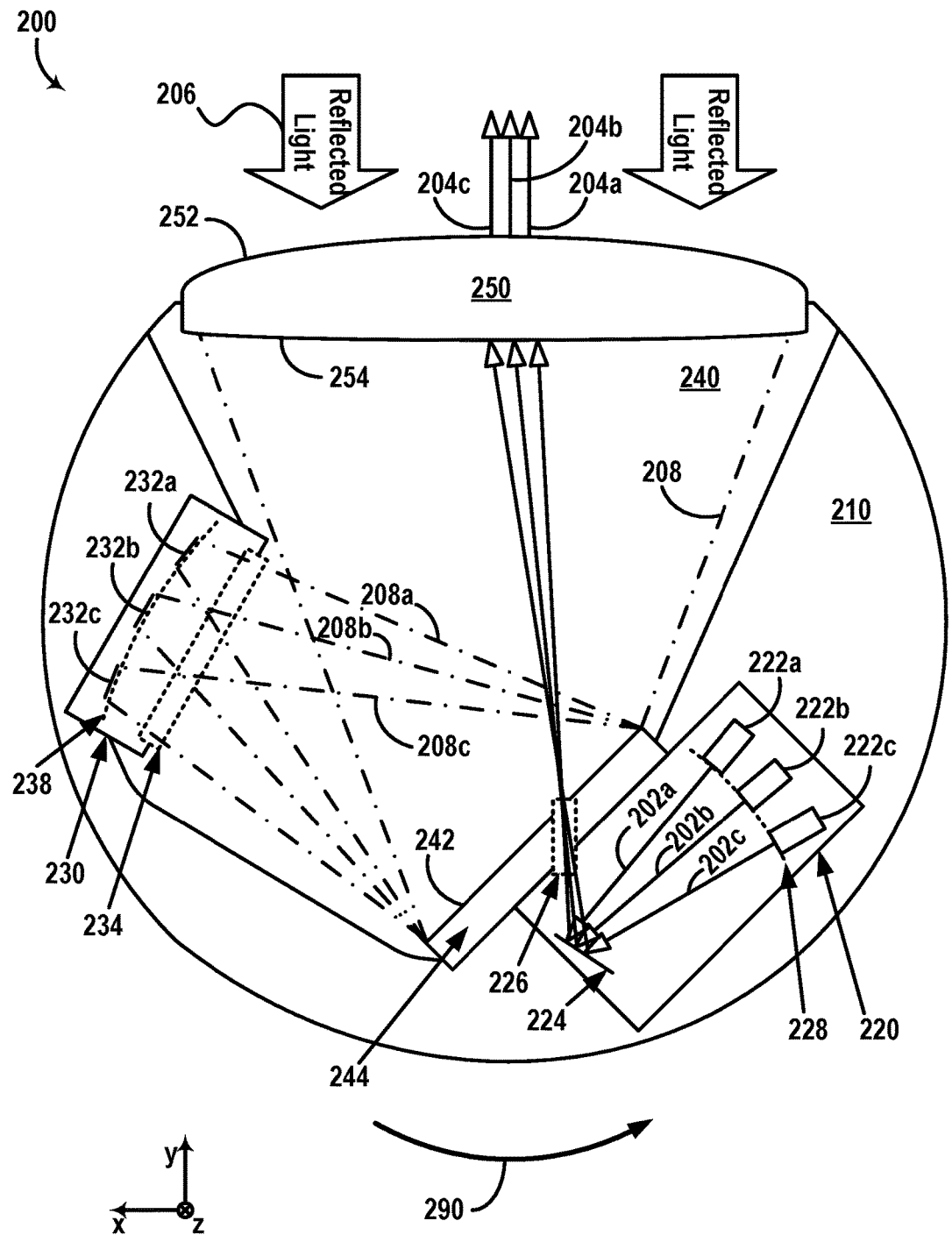
FIG. 2B is a cross-section view of the LIDAR device shown in FIG. 2A.

FIG. 2B is a cross-section view of the first LIDAR 200 shown in FIG. 2A. As shown, the housing 210 houses a transmit block 220, a receive block 230, a shared space 240, and the lens 250. For purposes of illustration, FIG. 2B shows an x-y-z axis, in which the z-axis is in a substantially vertical direction.

The transmit block 220 includes a plurality of light sources 222a-c arranged along a curved focal surface 228 defined by the lens 250. The plurality of light sources 222a-c can be configured to emit, respectively, the plurality of light beams 202a-c having wavelengths within a wavelength range. For example, the plurality of light sources 222a-c may comprise laser diodes that emit the plurality of light beams 202a-c having the wavelengths within the wavelength range. The plurality of light beams 202a-c are reflected by mirror 224 through an exit aperture 226 into the shared space 240 and towards the lens 250.

The light sources 222a-c can include laser diodes, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), or any other device configured to selectively transmit, reflect, and/or emit light to provide the plurality of emitted light beams 202a-c. In some examples, the light sources 222a-c can be configured to emit the emitted light beams 202a-c in a wavelength range that can be detected by detectors 232a-c included in the receive block 230. The wavelength range could, for example, be in the ultraviolet, visible, and/or infrared portions of the electromagnetic spectrum. In some examples, the wavelength range can be a narrow wavelength range, such as provided by lasers. In one embodiment, the wavelength range includes a source wavelength of 905 nm. Additionally, the light sources 222a-c can be configured to emit the emitted light beams 202a-c in the form of pulses. In some examples, the plurality of light sources 222a-c can be disposed on one or more substrates (e.g., printed circuit boards (PCB), flexible PCBs, etc.) and arranged to emit the plurality of light beams 202a-c towards the exit aperture 226.

Although FIG. 2B shows that the curved focal surface 228 is curved in the x-y plane, additionally or alternatively, the plurality of light sources 222a-c may be arranged along a focal surface that is curved in a vertical plane. For example, the curved focal surface 228 can have a curvature in a vertical plane, and the plurality of light sources 222a-c can include additional light sources arranged vertically along the curved focal surface 228 and configured to emit light beams directed at the mirror 224 and reflected through the exit aperture 226. In this example, the detectors 232a-c may also include additional detectors that correspond to additional light sources of the light sources 222a-c. Further, in some examples, the light sources 222a-c may include additional light sources arranged horizontally along the curved focal surface 228. In one embodiment, the light sources 222a-c may include 64 light sources that emit light having a wavelength of 905 nm. For instance, the 64 light sources may be arranged in four columns, each comprising 16 light sources, along the curved focal surface 228. In this instance, the detectors 232a-c may include 64 detectors that are arranged similarly (e.g., 4 columns comprising 16 detectors each, etc.) along curved focal surface 238. In other embodiments, the light sources 222a-c and the detectors 232a-c may include additional or fewer light sources and/or detectors than those shown in FIG. 2B.

Due to the arrangement of the plurality of light sources 222a-c along the curved focal surface 228, the plurality of light beams 202a-c, in some examples, may converge towards the exit aperture 226. Thus, in these examples, the exit aperture 226 may be minimally sized while being capable of accommodating vertical and horizontal extents of the plurality of light beams 202a-c. Additionally, in some examples, the curved focal surface 228 can be defined by the lens 250. For example, the curved focal surface 228 may correspond to a focal surface of the lens 250 due to shape and composition of the lens 250. In this example, the plurality of light sources 222a-c can be arranged along the focal surface defined by the lens 250 at the transmit block.

The plurality of light beams 202a-c propagate in a transmit path that extends through the transmit block 220, the exit aperture 226, and the shared space 240 towards the lens 250. The lens 250 collimates the plurality of light beams 202a-c to provide collimated light beams 204a-c into an environment of the LIDAR device 200. The collimated light beams 204a-c correspond, respectively, to the plurality of light beams 202a-c. In some examples, the collimated light beams 204a-c reflect off one or more objects in the environment of the LIDAR device 200 as reflected light 206. The reflected light 206 may be focused by the lens 250 into the shared space 240 as focused light 208 traveling along a receive path that extends through the shared space 240 onto the receive block 230. For example, the focused light 208 may be reflected by the reflective surface 242 as focused light 208a-c propagating towards the receive block 230.

The lens 250 may be capable of both collimating the plurality of light beams 202a-c and focusing the reflected light 206 along the receive path 208 towards the receive block 230 due to the shape and composition of the lens 250. For example, the lens 250 can have an aspheric surface 252 facing outside of the housing 210 and a toroidal surface 254 facing the shared space 240. By using the same lens 250 to perform both of these functions, instead of a transmit lens for collimating and a receive lens for focusing, advantages with respect to size, cost, and/or complexity can be provided.

The exit aperture 226 is included in a wall 244 that separates the transmit block 220 from the shared space 240. In some examples, the wall 244 can be formed from a transparent material (e.g., glass) that is coated with a reflective material 242. In this example, the exit aperture 226 may correspond to the portion of the wall 244 that is not coated by the reflective material 242. Additionally or alternatively, the exit aperture 226 may comprise a hole or cut-away in the wall 244.

The focused light 208 is reflected by the reflective surface 242 and directed towards an entrance aperture 234 of the receive block 230. In some examples, the entrance aperture 234 may comprise a filtering window configured to allow wavelengths in the wavelength range of the plurality of light beams 202a-c (e.g., source wavelength) emitted by the plurality of light sources 222a-c and attenuate other wavelengths. In some examples, the entrance aperture 234 may comprise a half-mirror configured to reflect a portion of the focused light 208a-c and allow another portion of the focused light 208a-c to propagate toward the detectors 232a-c. The focused light 208a-c reflected by the reflective surface 242 from the focused light 208a-c propagates, respectively, onto a plurality of detectors 232a-c.

The plurality of detectors 232a-c can be arranged along a curved focal surface 238 of the receive block 230. Although FIG. 2B shows that the curved focal surface 238 is curved along the x-y plane (horizontal plane), additionally or alternatively, the curved focal surface 238 can be curved in a vertical plane. The curvature of the focal surface 238 is also defined by the lens 250. For example, the curved focal surface 238 may correspond to a focal surface of the light projected by the lens 250 along the receive path at the receive block 230.

The detectors 232a-c may comprise photodiodes, avalanche photodiodes, phototransistors, cameras, active pixel sensors (APS), charge coupled devices (CCD), cryogenic detectors, or any other sensor of light configured to receive focused light 208a-c having wavelengths in the wavelength range of the emitted light beams 202a-c (e.g., the source wavelength).

Each of the focused light 208a-c corresponds, respectively, to the emitted light beams 202a-c and is directed onto, respectively, the plurality of detectors 232a-c. For example, the detector 232a is configured and arranged to received focused light 208a that corresponds to collimated light beam 204a reflected of the one or more objects in the environment of the LIDAR device 200. In this example, the collimated light beam 204a corresponds to the light beam 202a emitted by the light source 222a. Thus, the detector 232a receives light that was emitted by the light source 222a, the detector 232b receives light that was emitted by the light source 222b, and the detector 232c receives light that was emitted by the light source 222c.

By comparing the received light 208a-c with the emitted light beams 202a-c, at least one aspect of the one or more object in the environment of the LIDAR device 200 may be determined. For example, by comparing a time when the plurality of light beams 202a-c were emitted by the plurality of light sources 222a-c and a time when the plurality of detectors 232a-c received the focused light 208a-c, a distance between the LIDAR device 200 and the one or more object in the environment of the LIDAR device 200 may be determined. In some examples, other aspects such as shape, color, material, etc. may also be determined.

In some examples, the LIDAR device 200 may be rotated about an axis to determine a three-dimensional map of the surroundings of the LIDAR device 200. For example, the LIDAR device 200 may be rotated about a substantially vertical axis as illustrated by arrow 290. Although illustrated that the LIDAR device 200 is rotated counter clock-wise about the axis as illustrated by the arrow 290, additionally or alternatively, the LIDAR device 200 may be rotated in the clockwise direction. In some examples, the LIDAR device 200 may be rotated 360 degrees about the axis. In other examples, the LIDAR device 200 may be rotated back and forth along a portion of the 360 degree view of the LIDAR device 200. For example, the LIDAR device 200 may be mounted on a platform that wobbles back and forth about the axis without making a complete rotation.

Thus, the arrangement of the light sources 222a-c and the detectors 232a-c may allow the LIDAR device 200 to have a particular vertical field-of-view. In one example, the vertical FOV of the LIDAR device 200 is 20°. Additionally, the rotation of the LIDAR device 200 allows the LIDAR device 200 to have a 360° horizontal FOV Further, the rate of rotation may allow the device to have a particular refresh rate. In one example, the refresh rate is 10 Hz. The refresh rate along with the arrangement of the light sources 222a-c and the detectors 232a-c may also allow the LIDAR device 300 to have a particular angular resolution. In one example, the angular resolution is 0.2°×0.3°. However, the various parameters such as the refresh rate and the angular resolution may vary according to the configuration of the LIDAR device 200. Further, in some examples, the LIDAR device 200 may include additional, fewer, or different components than those shown in FIGS. 2A-2B.

Figure 2C:
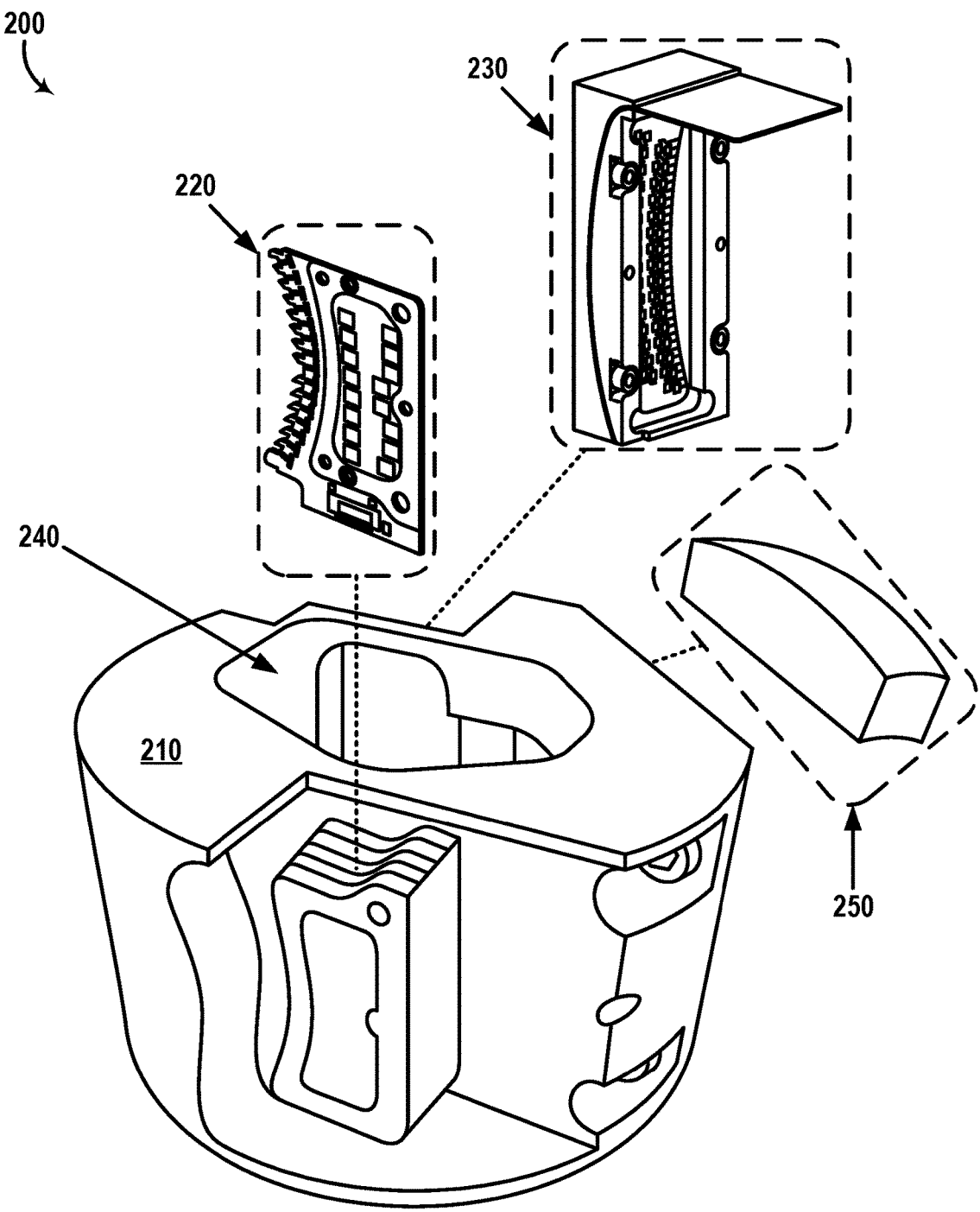
FIG. 2C is a perspective view of the LIDAR device shown in FIG. 2A with various components removed to illustrate an interior of the LIDAR device.

FIG. 2C is a perspective view of the LIDAR device 200 shown in FIG. 2A with various components removed to illustrate an interior of the LIDAR device 200. As shown, the various components of the LIDAR device 200 can be removably mounted to the housing 210. For example, the transmit block 220 may comprise one or more printed circuit boards (PCBs) that are fitted in the portion of the housing 210 where the transmit block 220 can be mounted. Although FIG. 2C shows the transmit block 220 with one PCB, in some embodiments, the transmit block 320 may include multiple PCBs (not shown) that each include some of the plurality of light sources 232a-c. In one embodiment, each PCB in the transmit block may include 16 light sources, and the transmit block 220 may include four PCBs. Thus, in this embodiment, the LIDAR device 200 may include 64 light sources. Other embodiments are possible as well where the transmit block 220 includes a different number of light sources. Additionally, the receive block 230 may comprise a plurality of detectors (e.g., detectors 232a-c, etc.) mounted to a flexible substrate and can be removably mounted to the housing 210 as a block that includes the plurality of detectors. Similarly, the lens 250 can be mounted to another side of the housing 210.

Figure 3:
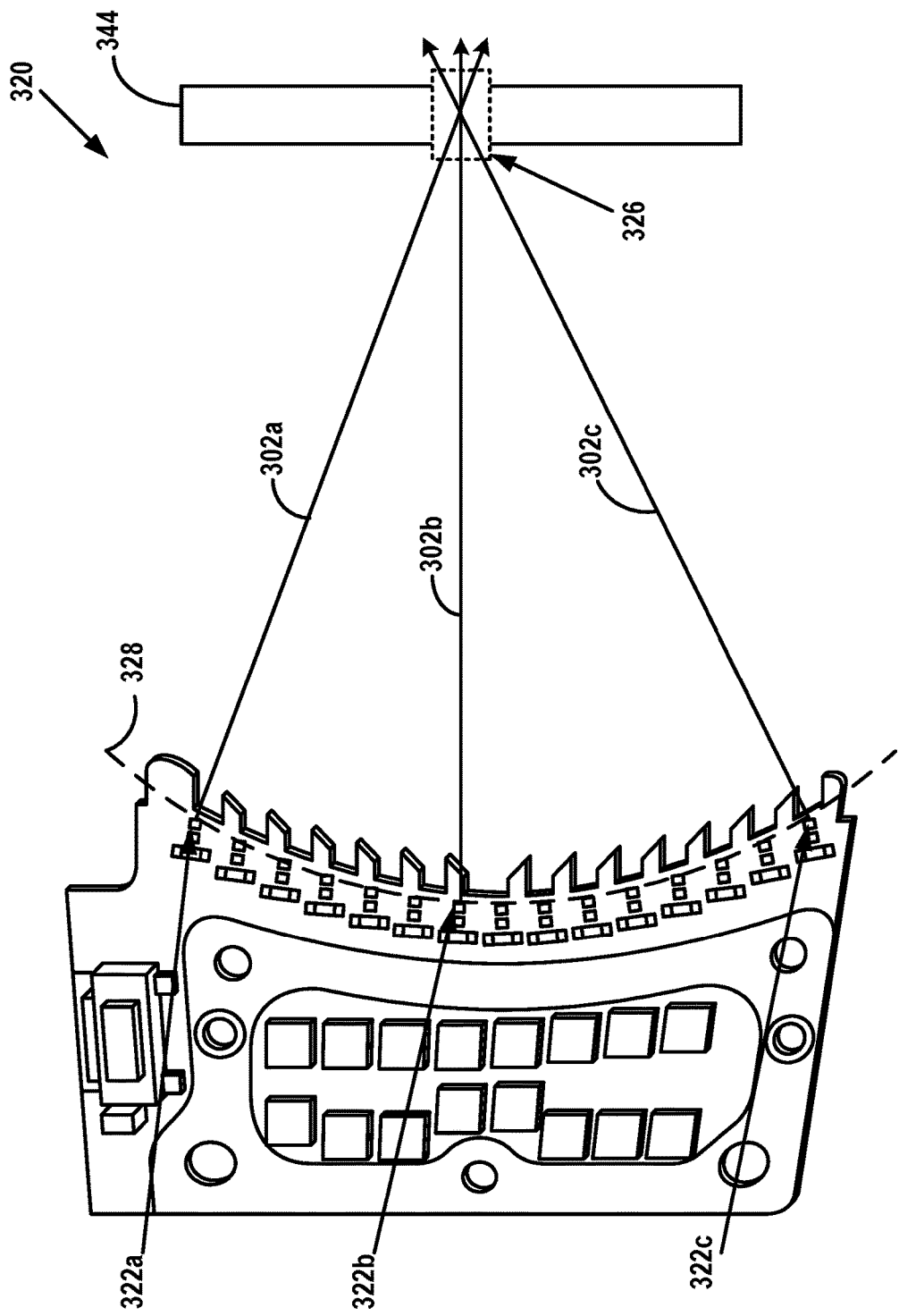
FIG. 3 illustrates a transmit block, according to an example embodiment.

FIG. 3 illustrates a transmit block 320, according to an example embodiment. Transmit block 320 may be similar to the transmit blocks 120 and/or 220 described in FIGS. 1-2. For example, the transmit block 320 includes a plurality of light sources 322a-c similar to the plurality of light sources 222a-c included in the transmit block 220 of FIGS. 2A-2C. Additionally, the light sources 322a-c are arranged along a focal surface 328, which is curved in a vertical plane. The light sources 322a-c are configured to emit a plurality of light beams 302a-c that converge and propagate through an exit aperture 326 in a wall 344.

Although the plurality of light sources 322a-c can be arranged along a focal surface 328 that is curved in a vertical plane, additionally or alternatively, the plurality of light sources 322a-c can be arranged along a focal surface that is curved in a horizontal plane or a focal surface that is curved both vertically and horizontally. For example, the plurality of light sources 322a-c can be arranged in a curved three dimensional grid pattern. For example, the transmit block 320 may comprise a plurality of printed circuit boards (PCBs) vertically mounted such that a column of light sources such as the plurality of light sources 322a-c are along the vertical axis of each PCB and each of the plurality of PCBs can be arranged adjacent to other vertically mounted PCBs along a horizontally curved plane to provide the three dimensional grid pattern. Alternatively, in some examples, the light sources 322a-c may be arranged along any other surface such as a linear surface. Further, although the transmit block 320 is shown to include multiple light sources 322a-c, in some examples, the transmit block 320 may include only one light source or a different number of light sources than those shown in FIG. 3.

As shown in FIG. 3, the light beams 302a-c converge towards the exit aperture 326 which allows the size of the exit aperture 326 to be minimized while accommodating vertical and horizontal extents of the light beams 302a-c similarly to the exit aperture 226 described in FIG. 2B.

Figure 4A:
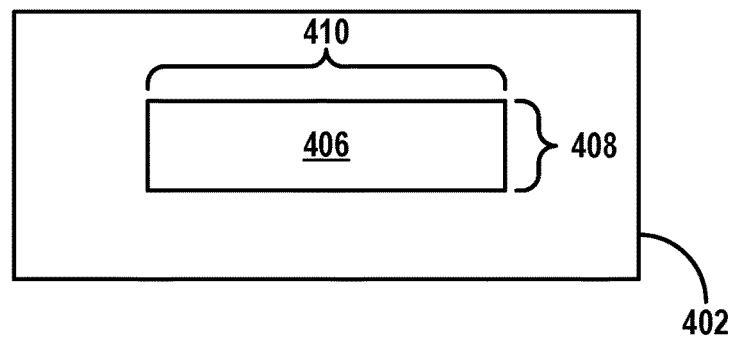
FIG. 4A is a view of a light source, according to an example embodiment.
Figure 4B:
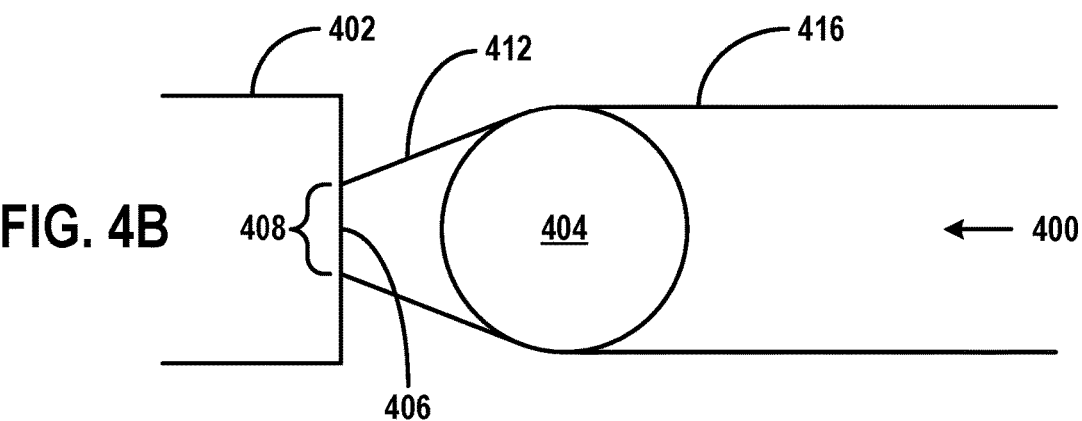
FIG. 4B is a view of the light source of FIG. 4A in combination with a cylindrical lens, according to an example embodiment.
Figure 4C:
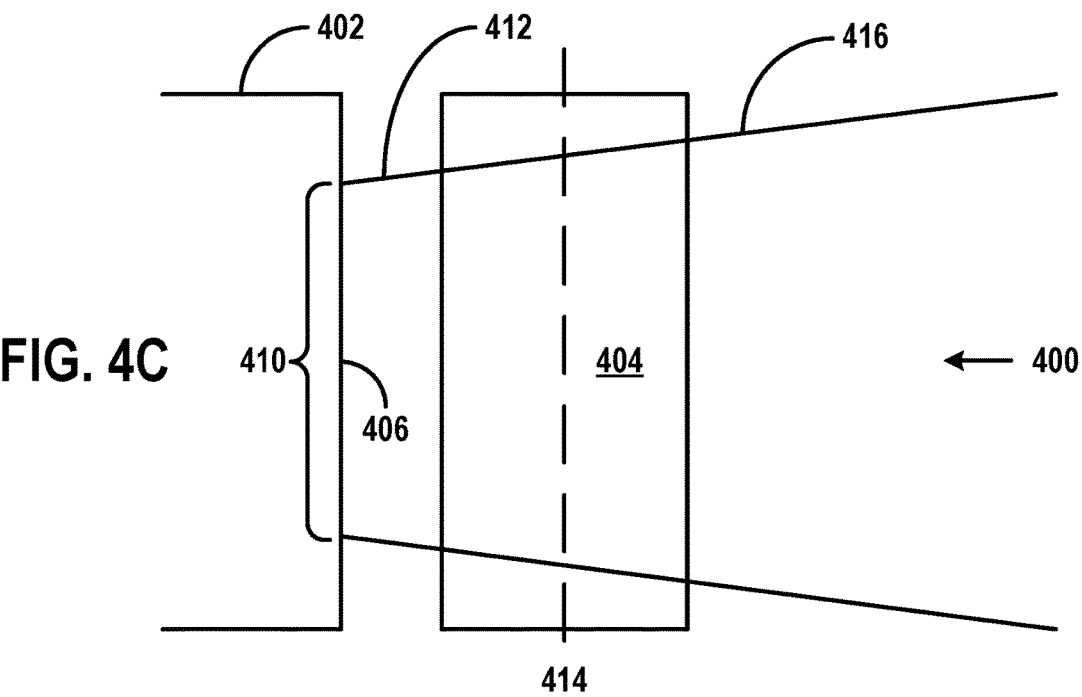
FIG. 4C is another view of the light source and cylindrical lens combination of FIG. 4B, according to an example embodiment.

The light emitted by the light sources 222a-c may be partially collimated to fit through the exit aperture 224. FIGS. 4A, 4B, and 4C illustrate an example of how such partial collimation could be achieved. In this example, a light source 400 is made up of a laser diode 402 and a cylindrical lens 404. As shown in FIG. 4A, laser diode 402 has an aperture 406 with a shorter dimension corresponding to a fast axis 408 and a longer dimension corresponding to a slow axis 410. FIGS. 4B and 4C show an uncollimated laser beam 412 being emitted from laser diode 402. Laser beam 412 diverges in two directions, one direction defined by fast axis 408 and another, generally orthogonal direction defined by slow axis 410. FIG. 4B shows the divergence of laser beam 412 along fast axis 408, whereas FIG. 4C shows the divergence of laser beam 412 along slow axis 410. Laser beam 412 diverges more quickly along fast axis 408 than along slow axis 410.

In one specific example, laser diode 402 is an Osram SPL DL90_3 nanostack pulsed laser diode that emits pulses of light with a range of wavelengths from about 896 nm to about 910 nm (a nominal wavelength of 905 nm). In this specific example, the aperture has a shorter dimension of about 10 microns, corresponding to its fast axis, and a longer dimension of about 200 microns, corresponding to its slow axis. The divergence of the laser beam in this specific example is about 25 degrees along the fast axis and about 11 degrees along the slow axis. It is to be understood that this specific example is illustrative only. Laser diode 402 could have a different configuration, different aperture sizes, different beam divergences, and/or emit different wavelengths.

As shown in FIGS. 4B and 4C, cylindrical lens 404 may be positioned in front of aperture 406 with its cylinder axis 414 generally parallel to slow axis 410 and perpendicular to fast axis 408. In this arrangement, cylindrical lens 404 can pre-collimate laser beam 412 along fast axis 408, resulting in partially collimated laser beam 416. In some examples, this pre-collimation may reduce the divergence along fast axis 408 to about one degree or less. Nonetheless, laser beam 416 is only partially collimated because the divergence along slow axis 410 may be largely unchanged by cylindrical lens 404. Thus, whereas uncollimated laser beam 412 emitted by laser diode has a higher divergence along fast axis 408 than along slow axis 410, partially collimated laser beam 416 provided by cylindrical lens 404 may have a higher divergence along slow axis 410 than along fast axis 408. Further, the divergences along slow axis 410 in uncollimated laser beam 412 and in partially collimated laser beam 416 may be substantially equal.

In one example, cylindrical lens 404 is a microrod lens with a diameter of about 600 microns that is placed about 250 microns in front of aperture 406. The material of the microrod lens could be, for example, fused silica or a borosilicate crown glass, such as Schott BK7. Cylindrical lens 404 could also be used to provide magnification along fast axis 408. For example, if the dimensions of aperture 406 are 10 microns by 200 microns, as previously described, and cylindrical lens 404 is a microrod lens as described above, then cylindrical lens 404 may magnify the shorter dimension (corresponding to fast axis 408) by about 20 times. This magnification effectively stretches out the shorter dimension of aperture 406 to about the same as the longer dimension. As a result, when light from laser beam 416 is focused, for example, onto a detector, the focused spot could have a substantially square shape instead of the rectangular slit shape of aperture 406.

Figure 5A:
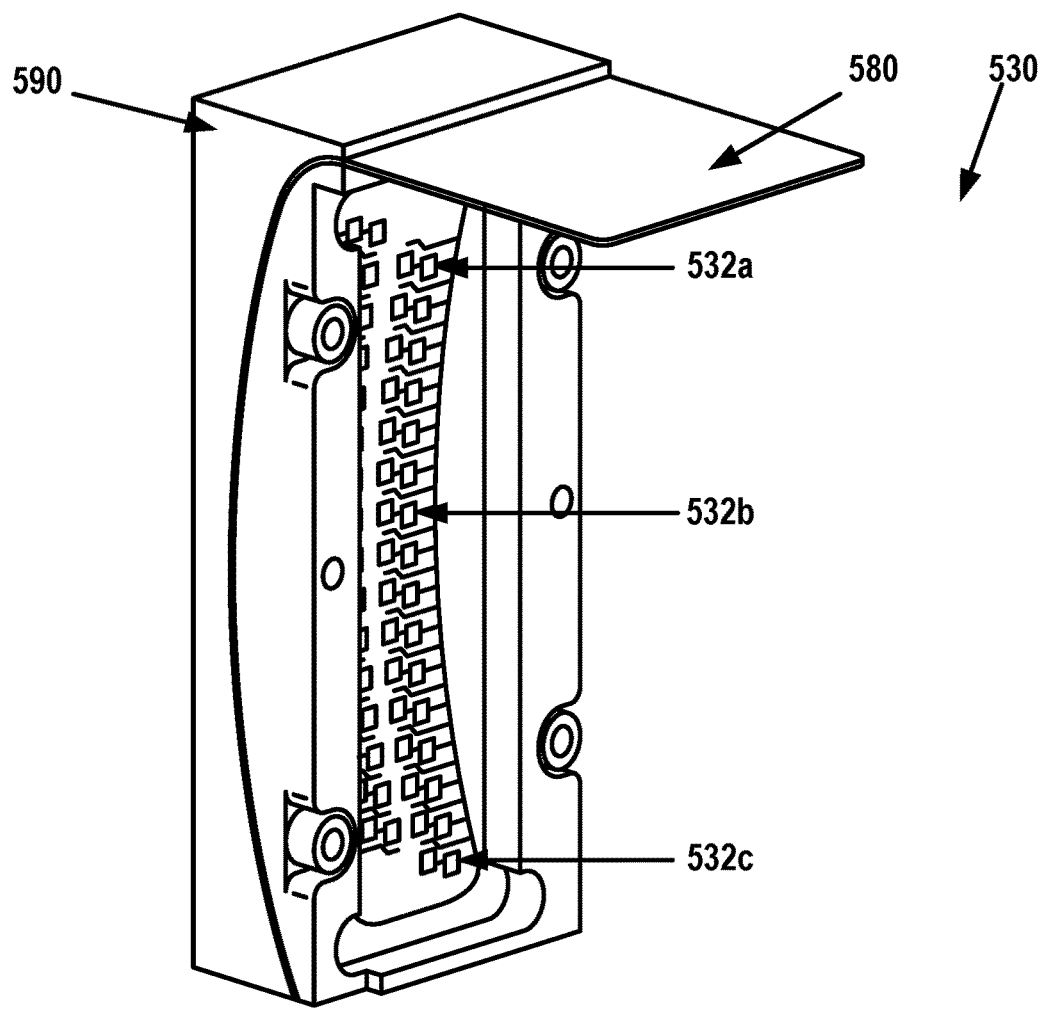
FIG. 5A illustrates a receive block, according to an example embodiment.
Figure 5B:
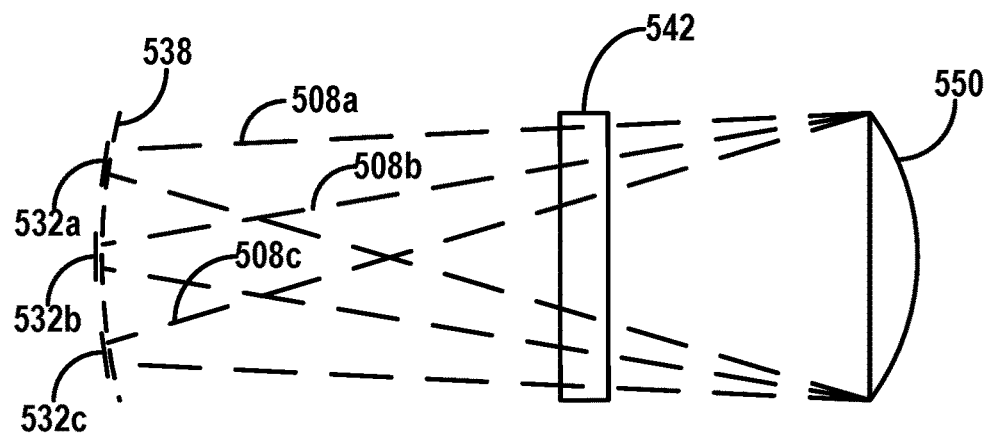
FIG. 5B illustrates a side view of three detectors included in the receive block of FIG. 5A.

FIG. 5A illustrates a receive block 530, according to an example embodiment. FIG. 5B illustrates a side view of three detectors 532a-c included in the receive block 530 of FIG. 5A. Receive block 530 may be similar to the receive block 130 of FIG. 1 and/or the receive block 230 of FIGS. 2B-2C. For example, the receive block 530 includes a plurality of detectors 532a-c arranged along a curved surface 538 defined by a lens 550 similarly to the receive block 230, the detectors 232a-c, and the curved plane 238 described in FIG. 2B. Focused light 508a-c from lens 550 propagates along a receive path that includes a reflective surface 542 onto the detectors 532a-c similar, respectively, to the focused light 208a-c, the lens 250, the reflective surface 242, and the detectors 232a-c described in FIG. 2B.

The receive block 530 comprises a flexible substrate 580 on which the plurality of detectors 532a-c are arranged along the curved surface 538. The flexible substrate 580 conforms to the curved surface 538 by being mounted to a receive block housing 590 having the curved surface 538. As illustrated in FIG. 5B, the curved surface 538 includes the arrangement of the detectors 532a-c curved along a vertical and horizontal axis of the receive block 530.

In some embodiments, the number and arrangement of the detectors 532a-c may be different than those shown in FIGS. 5A-5B. For instance, the detectors 532a-c may be alternatively arranged along a linear surface, or may alternatively only include one detector, among other possibilities.

Figure 6A:
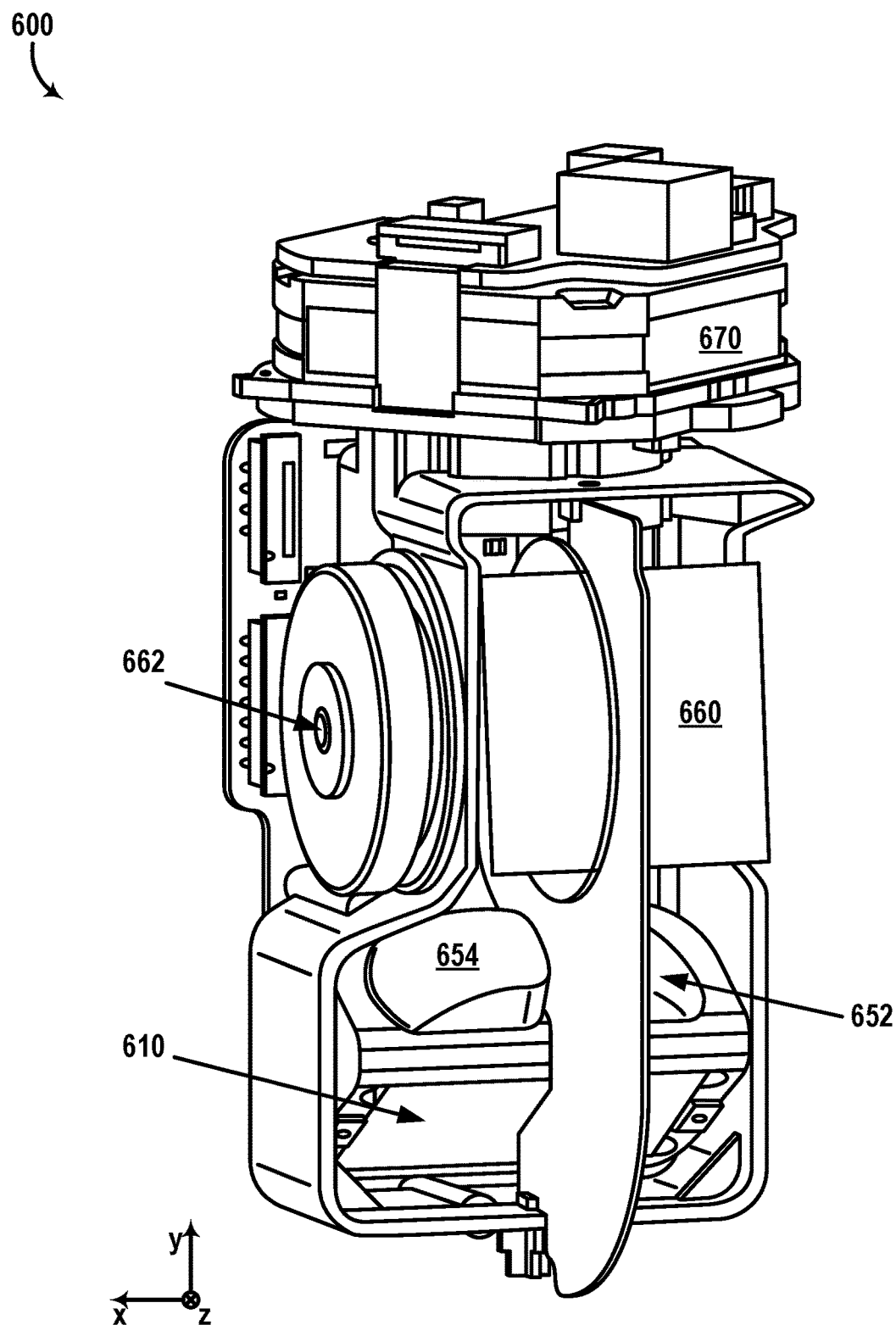
FIG. 6A illustrates another LIDAR device, according to an example embodiment.

As noted above in the description of FIG. 1, the system 100 may be used with various LIDAR devices having various configurations, such as the LIDAR device 200 of FIGS. 2A-2C. FIG. 6A illustrates another LIDAR device 600 that may be used with the system 100, according to an example embodiment.

As shown, the LIDAR device 600 includes an optics assembly 610, a transmit lens 652, a receive lens 654, a mirror 620, a pin 622, and a motor 670. For purposes of illustration, FIG. 6A shows an x-y-z axis, in which the z-axis is pointing out of the page, and the x-axis and y-axis define a horizontal plane along the surface of the page.

In some examples, the LIDAR device 600 may emit light that propagates away from the mirror 660 along a viewing direction of the LIDAR device 600 (e.g., parallel to z-axis shown in FIG. 6A, etc.) toward an environment of the LIDAR device 600, and may receive reflected light from one or more objects in the environment.

Accordingly, the optics assembly 610 may be configured to emit light pulses towards the mirror 660 that are then reflected by the mirror 660 towards the environment. Further, the optics assembly 610 may be configured to receive reflected light that is reflected off the mirror 660. In one embodiment, the optics assembly 610 may include a single laser emitter that is configured to provide a narrow beam having a wavelength of 905 nm. In other embodiments, the optics assembly 610 may include multiple light sources similarly to the LIDAR device 200 of FIGS. 2A-2C. As shown, the optics assembly 610 includes the transmit lens 652 for collimation and/or focusing of emitted light from the optics assembly 610 onto the mirror 620, and a receive lens 654 for focusing reflected light from the mirror 660 onto one or more detectors (not shown) of the optics assembly 610. However, in some examples, the optics assembly 610 may alternatively include a single lens for both collimation of emitted light and focusing of reflected light similarly to the lens 250 of the LIDAR device 200.

As shown, the mirror 660 may be arranged to steer emitted light from the transmit lens 652 towards the viewing direction of the LIDAR device 600. Further, for example, the mirror 660 may be arranged to steer reflected light from the mirror 660 towards the receive lens 654. In some examples, the mirror 6690 may be a triangular mirror that performs complete rotations about an axis defined by the pin 662. In one embodiment, the vertical FOV of the LIDAR device 600 is 110°.

The pin 662 may be configured to mount the mirror 660 to the LIDAR device 600. In turn, the pin 662 can be formed from any material capable of supporting the mirror 660. For example, the pin 662 may be formed from a solid material such as plastic or metal among other possibilities. In some examples, the LIDAR device 600 may be configured to rotate the mirror 660 about the pin 662 for complete rotations to steer emitted light from the optics assembly 610 vertically. In other examples, the LIDAR device 600 may be configured to rotate the mirror 660 about the pin 662 over a given range of angles to steer the emitted light. Thus, in some examples, various vertical FOVs are possible by adjusting the rotation the mirror 660 about the pin 662.

The motor 670 may include any motor such as a stepper motor, an electric motor, a combustion motor, a pancake motor, and/or a piezoelectric actuator among other possibilities. In some examples, the motor 670 may be configured to rotate various components of the LIDAR device 600 (e.g., optics assembly 610, mirror 660, pin 662, etc.) about an axis of the LIDAR device 600. For example, the axis may be substantially vertical similarly to the y-axis shown in FIG. 6A. By rotating the various components of the LIDAR device 600 about the axis, in some examples, the motor 670 may steer the emitted light that is reflected off the mirror 660 horizontally, thus allowing the LIDAR device 600 to have a horizontal FOV. In one embodiment, the motor 670 may rotate for a defined amount of rotation such as 270°. In this embodiment, the LIDAR device 600 may thus have a horizontal FOV of 270. However, other amounts of rotation are possible as well (e.g., 360°, 8°, etc.) thereby allowing a different horizontal FOV for the LIDAR device 600. Thus, in some examples, the LIDAR device 600 may provide an alternative device for scanning the environment or a portion thereof to the LIDAR device 104 of FIG. 1, and/or the LIDAR device 200 of FIGS. 2A-2C.

Figure 6B:
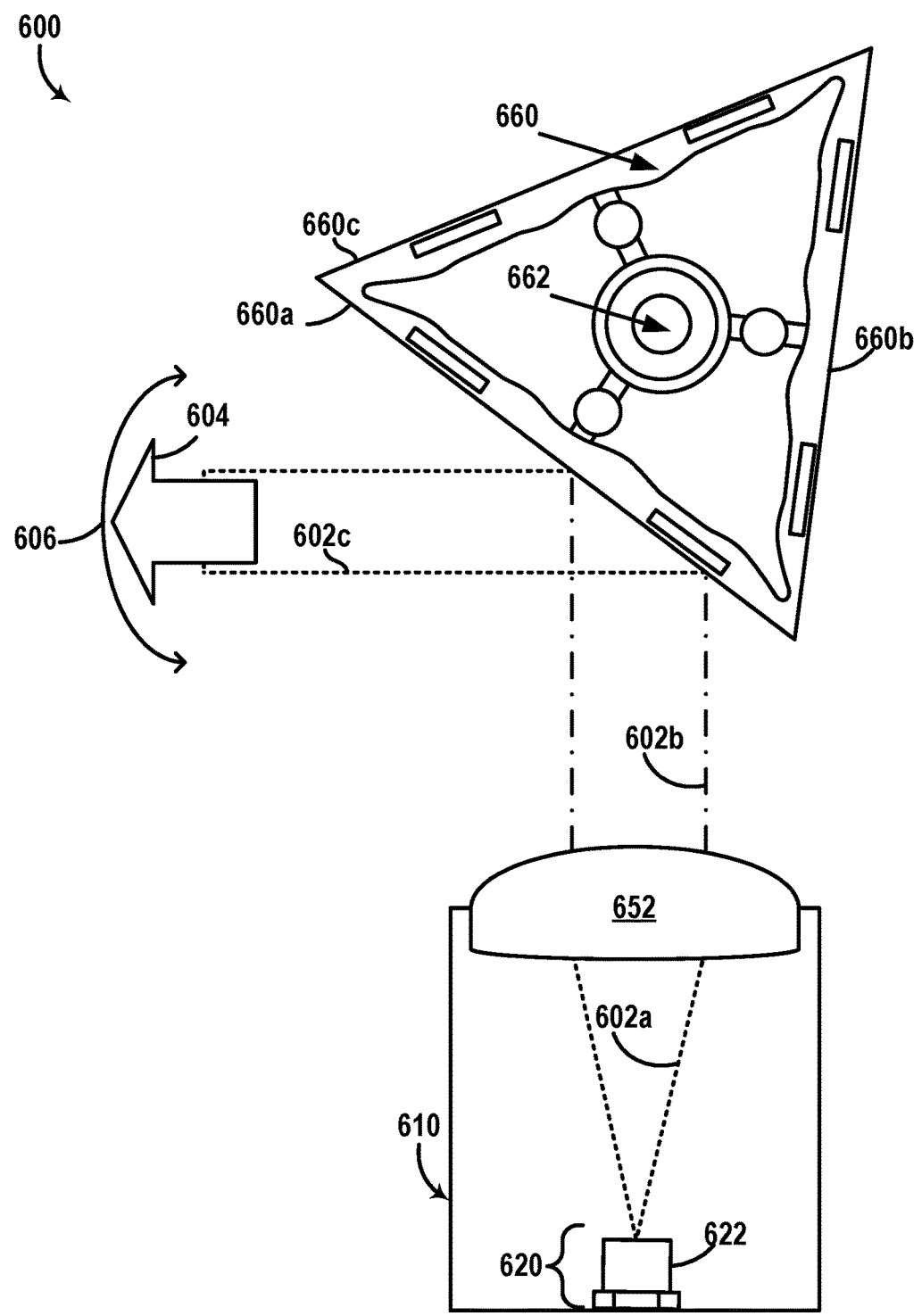
FIG. 6B illustrates a partial cross-section view of the LIDAR device of FIG. 6A.

FIG. 6B illustrates a partial cross-section view of the LIDAR device 600 shown in FIG. 6A. It is noted that some of the components of the LIDAR device 600 are omitted from the illustration of FIG. 6B for convenience in description.

As shown, the optics assembly 610 comprises a transmit block 620 that includes one light source 622. In some examples, the transmit block 620 may alternatively include more than one light source similarly to the transmit block 220 of the LIDAR device 200. However, for the sake of example, the transmit block 620 includes one light source 622. The light source 622 may be configured to emit one or more light pulses (e.g., laser beams, etc.) towards the transmit lens 652. For example, as shown, emitted light 602a propagates away from the light source 622 towards the transmit lens 652. In some examples, the light source 622 may be similar to the light sources 222a-c of the LIDAR device 200 of FIGS. 2A-2C. In one embodiment, the light source 622 may be configured to emit light pulses having a wavelength of 905 nm. In other embodiments, the light source 622 may be configured to emit light having any other wavelength.

In line with the discussion above, the transmit lens 652 may be configured to collimate the emitted light 602a into one or more collimated light beams 602b and/or may be configured to focus the emitted light 602a as the focused light 602b onto the mirror 660.

As shown, the mirror 660 may be a triangular mirror that has three reflective surfaces 660a, 660b, 660c. However, in other examples, the mirror 660 may alternatively include a greater or fewer number of reflective surfaces. As shown, the collimated light 602b may then reflect off the reflective surface 602a and into the environment of the LIDAR 600 as emitted light 602c. For example, a direction of the emitted light 602c is illustrated by arrow 604. In practice, as the mirror 660 is rotated about an axis defined by the pin 662, the emitted light 602c may be steered to have a different direction than that illustrated by arrow 604. For example, the direction 604 of the emitted light 602c may instead correspond to a different direction along arrow 606. Thus, by rotating the mirror 660 about the pin 662, the LIDAR device 600 may be configured to have a vertical FOV, for example.

Consider by way of example a scenario where the mirror 660 is configured to rotate about an axis defined by the pin 662 continuously in a clock-wise direction. In this scenario, the direction 604 of the emitted light 602c may thereby be adjusted also in a clock-wise direction as illustrated by the arrow 606 until the focused light 602b is reflecting off an edge of the reflective surface 660a. At this point, the emitted light 602c would be directed towards a maximum extent of the vertical FOV of the LIDAR device 600. Continuing with the scenario, as the mirror 660 continues to rotate, the collimated light 602b may then be focused onto the reflective surface 660b instead of the reflective surface 660a. At this point, the reflected light 602c may be steered to a direction that is towards a minimum extent of the vertical FOV of the LIDAR device 600. Continuing with the scenario, as the mirror 660 continues to rotate, the direction of the emitted light 602c may then be adjusted in a clock-wise direction towards the maximum extent of the vertical FOV that corresponds to the light 602b being focused onto another edge of the reflective surface 660b. Similarly, continuing with the scenario, the direction of the emitted light 602c may then be adjusted to scan the vertical FOV of the LIDAR device 600 by reflecting the light 602b off the reflective surface 660c instead of the reflective surface 660b. Through this process, for example, the LIDAR device 600 may continuously scan the vertical FOV. As a variation of the scenario above by way of example, the mirror 660 may be alternatively configured to rotate within a given range of angles (e.g., wobble, etc.) to define a narrower vertical field-of-view than that of the scenario described above. Other configurations for rotation of the mirror 660 are possible as well.

Figure 6C:
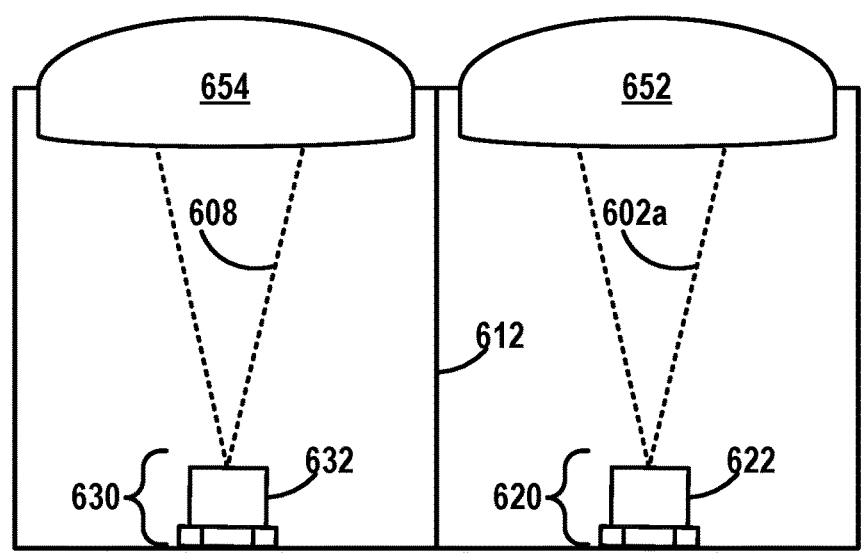
FIG. 6C illustrates a partial cross-section view of the optics assembly in the LIDAR device of FIG. 6A.
Figure 6C:
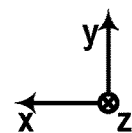

FIG. 6C illustrates a partial cross-section view of the optics assembly 610 in the LIDAR device 600 of FIG. 6A. For purposes of illustration, FIG. 6C shows an x-y-z axis, in which the z-axis is pointing out of the page, and the x-axis and y-axis define a horizontal plane along the surface of the page.

As shown, the optical assembly 610 comprises transmit block 620 that includes one light source 622. The light source 622 may be similar to the light sources 222a-c of the LIDAR device 200. In line with the discussion above, in some examples, the transmit block 620 may alternatively include more than one light source. The light source 622 is configured to emit light 602a toward the transmit lens 652. Further, the optical assembly 610 comprises receive block 630 that includes one detector 632. The detector 632 may be similar to the detectors 232a-c of the LIDAR device 200. Again, in some examples, the receive block 630 may alternatively include more than one detector. The detector 632 may be configured to receive light 608 focused by the receive lens 654.

As shown, the optics assembly 610 also includes an optical shield 612. The optical shield 612 may be configured to provide optical shielding between the transmit block 620 and the receive block 630, at least for the light having the source wavelength of the emitted light 602a. In turn, the optical shield 612 may mitigate interference with light 608 detected by the detector 632 of the receive block 630. The optical shield 612 may be formed, for example, as a wall coated by a metal, metallic ink, or metallic foam to provide the shielding. Example metals may include copper or nickel. Other configurations and/or materials are possible as well for the optical shield 612.

As noted in the description of the system 100 of FIG. 1, in some examples, the present method allows alignment of the detector 632 with light originating at the light source 622. By way of example, an alignment apparatus (e.g., apparatus 160) may couple to the transmit block 620 and/or the receive block 630, and may then adjust the relative position between the transmit block 620 and the receive block 630 to perform the alignment.

The optical components (i.e., the transmit block 620 and the receive block 630) of the optical assembly 610 may each have six degrees of freedom (DOF). Three of the six DOF are translational: forward/backward (e.g., linearly along an axis of the optical component that is parallel to the y-axis shown in FIG. 6C), up/down (e.g., linearly along an axis of the optical component that is parallel to the z-axis), and left/right (e.g., linearly along an axis of the optical component that is parallel to the x-axis). Further, three of the six DOF are rotational: pitch (e.g., rotation about the axis of the optical component that is parallel to the x-axis), yaw (e.g., rotation about the axis of the optical component that is parallel to the z-axis), and roll (e.g., rotation about the axis of the optical component that is parallel to the y-axis). In accordance with the present disclosure, the alignment apparatus (not shown) may adjust the relative position between the transmit block 620 and the receive block 630 shown in FIG. 6C by adjusting some or all of the six DOF described above for one or both of the transmit block 620 and the receive block 630.

In line with the discussion above, systems and methods herein allow optics alignment for LIDAR devices having various different configurations. Thus, the configurations of the LIDAR devices 200 and 600 are presented for exemplary purposes only. Other configurations and LIDAR devices are possible as well for the systems and methods herein.

Figure 7A:
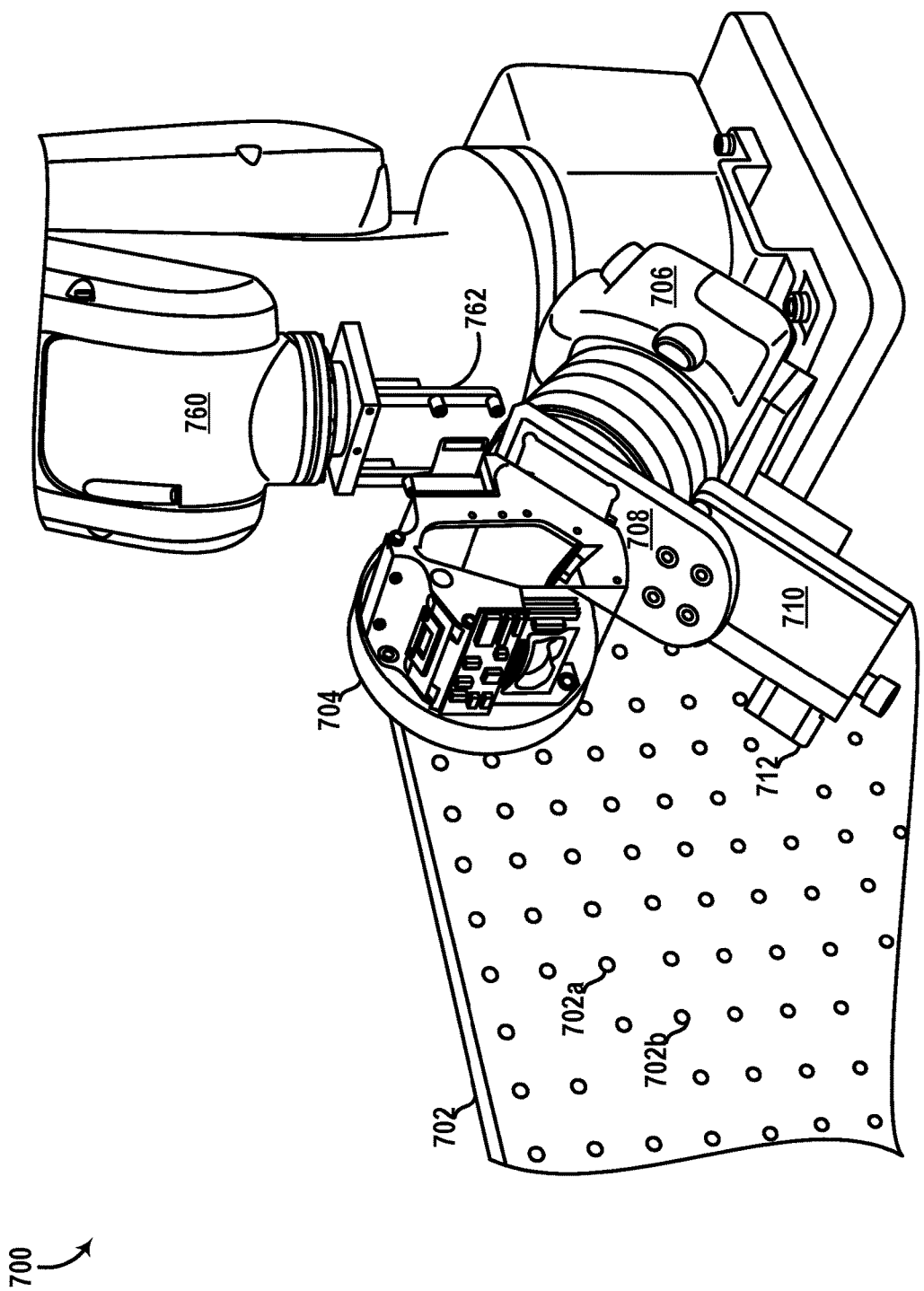
FIG. 7A illustrates a system, according to an example embodiment.

FIG. 7A illustrates a system 700, according to an example embodiment. The system 700 may be similar to the system 100 of FIG. 1. For example, as shown, the system 700 includes a mounting platform 702, a LIDAR device 704, a camera 706, a light filter 708, and an alignment apparatus 760 that can be similar, respectively, to the mounting platform 102, the LIDAR device 104, the camera 106, the light filter 108, and the alignment apparatus 160 of the system 100. As shown, the system 700 also includes a mounting structure 710, an actuator 712, and a manipulator 762.

The mounting structure 710 may be formed from any solid material (e.g., metal, plastic, etc.) similarly to the mounting platform 702, and may be shaped to facilitate coupling one or more of the components of the system 700 to the mounting platform 702. As shown, for example, the mounting structure 710 couples the camera 706 and the light filter 708 to the mounting platform 702. However, in some examples, a separate mounting structure may be utilized for each of the camera 706 and the light filter 708.

The actuator 712 may be configured to adjust a position of the light filter 708. Example actuators may include motors, stepper motors, pneumatic actuators, hydraulic pistons, relays, solenoids, and piezoelectric actuators among other possibilities.

The manipulator 762 may include any structure configured to couple the alignment apparatus 702 with one or more components of the LIDAR device 704. In line with the discussion above, the system 700 may adjust a relative position between a transmit block (not shown) and a receive block (not shown) of the LIDAR device 704. For instance, the alignment apparatus 760 (e.g., robotic arm, etc.) may adjust the relative position between the transmit block and the receive block by adjusting the position of the manipulator 762 or changing the orientation of the manipulator 762, among other possibilities.

As shown, the mounting platform 702 includes a plurality of holes, exemplified by holes 702a and 702b. In some embodiments, the various components such as the LIDAR device 704, the camera 706, and/or the light filter 708 may be mounted to the mounting platform by coupling the various components to such holes in the mounting platform (e.g., by fastening a bolt through the holes). In other embodiments, the various components may be mounted to the mounting platform 702 via other processes or devices. In one example, the various components may be mounted to the mounting platform 702 via an application of an adhesive among other possibilities. In another example, a mounting structure may couple one or more of the components to the mounting platform 702. For instance, as shown in FIG. 7A, the mounting structure 710 may be coupled to the mounting platform 702 (e.g., by fastening a bolt to one of the holes, etc.), and may also be coupled the camera 706 and the light filter 708 to provide the particular positions of the camera 706 and the light filter 708 relative to the mounting platform 702. Other configurations and shapes of the mounting structure 710 are possible as well.

Further, as shown, the LIDAR device 704 has a configuration similar to the LIDAR device 200 of FIGS. 2A-2C. However, in some examples, other configurations are possible for the LIDAR device 704, such as the configuration of the LIDAR device 600 of FIGS. 6A-6C among other possibilities.

An example scenario for operation of the system 700 is as follows. First, as shown, the LIDAR device 704 may be mounted to the mounting platform 702 to have a field-of-view (FOV) through which light emitted by a transmit block (not shown) of the LIDAR device 704 and light received by a receive block (not shown) of the LIDAR device 704 propagates. For instance, the LIDAR device 704 may be mounted to the mounting platform 702 using the alignment apparatus 760 (e.g., robotic arm, etc.) or any other device (e.g., mechanical tool, etc.). Next, the camera 706 may be located at a given position relative to the LIDAR device 704 such that the camera 706 may obtain images of the receive block (not shown) of the LIDAR device 704 and/or light emitted by the transmit block (not shown) of the LIDAR device 704.

Continuing with the scenario, the camera 706 may then be focused to infinity for the source wavelength (e.g., 905 nm) of the light emitted by the LIDAR device 704. Next, the light filter 708 may be positioned at a first position to be interposed between the LIDAR device 704 and the camera 706 along the FOV of the LIDAR device 704. For instance, the actuator 712 may be configured to move the light filter 708 to the first position shown in FIG. 7A.

Continuing with the scenario, the system 700 may then cause the transmit block (not shown) of the LIDAR device 704 to emit one or more light beams through the light filter 708 and toward the camera 706. Referring back to FIG. 2B by way of example, the light beams may correspond to the light beams 204a-c propagating out of the lens 250. Next, the camera 706 may obtain a first image of the light beams emitted by the LIDAR device 704. Continuing with the example of FIG. 2B, the first image may indicate light source positions of light sources 222a-c in the LIDAR device 200. At this point in the scenario, the system may then cause the LIDAR device 704 to stop emitting the light beams.

Continuing with the scenario, the system may then cause the actuator 712 to move the light filter 708 to a second position where the light filter 708 is not interposed between the camera 706 and the LIDAR 704. FIG. 7B illustrates the light filter 708 at the second position described above. In turn, the camera 706 may obtain a second image. The second image may indicate detector positions of detectors in a receive block (not shown) of the LIDAR device 704. Referring back to FIG. 2B by way of example, the second image may represent the detector positions of detectors 232*a-c* that are viewable to the camera 706 via mirror 242 and lens 250.

Continuing with the scenario, the system 700 may then determine at least one offset based on the first image and the second image. In one instance, the at least one offset may include distances between adjacent light sources and/or adjacent detectors of the LIDAR device 704. In another instance, the at least one offset may include distances between light beams emitted by light sources in the LIDAR device 704 and corresponding detectors of the LIDAR device 704. Other offsets are possible as well and are described in greater detail within exemplary embodiments herein.

In line with the discussion above, the alignment apparatus 760 (e.g., robotic arm, etc.) may couple to the transmit block (not shown) and/or the receive block (not shown) of the LIDAR device 704 via the manipulator 762. Thus, in the scenario, the alignment apparatus 760 may then adjust the relative position between the transmit block and the receive block in accordance with the determined at least one or more offset.

Figure 7C:
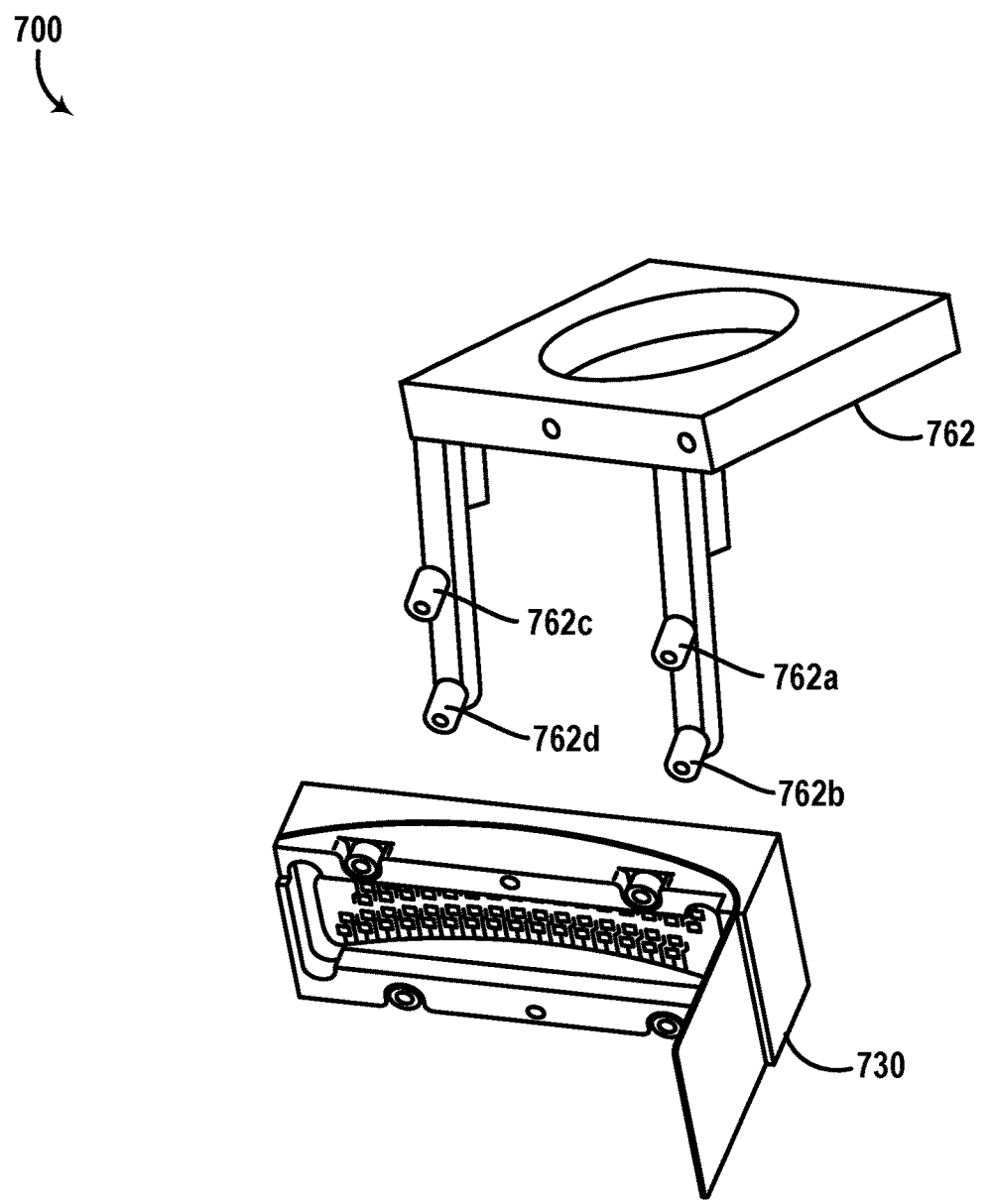
FIG. 7C illustrates a partial view of the system shown in FIGS. 7A-7B.

FIG. 7C illustrates a partial view of the system 700 shown in FIGS. 7A-7B. It is noted that some of the components of the system 700 are omitted from the illustration of FIG. 7C for convenience in description. For purposes of illustration, FIG. 7C shows an x-y-z axis, in which the z-axis is pointing out of the page, and the x-axis and y-axis define a horizontal plane along the surface of the page.

As shown in FIG. 7C, the manipulator 762 includes protrusions 762*a-d* that may be configured to couple with receive block 730. The receive block 730 may be included in the LIDAR device 704 shown in FIGS. 7A-7B. It is noted that other components of the LIDAR device 704 (e.g., transmit block, etc.) are omitted from the illustration of FIG. 7C for convenience in description. The receive block 730 may be similar to the receive block 230 of the system 200. However, in some embodiments, the receive block 730 may take any other form such as the configuration of the receive block 630 among other possibilities.

Similarly to the description of the receive block 630 of FIG. 6C, the receive block 730 has six degrees of freedom (DOF). Three of the six DOF are translational: forward/backward (e.g., linearly along an axis of the receive block 730 that is parallel to the z-axis shown in FIG. 7C), up/down (e.g., linearly along an axis of the receive block 730 that is parallel to the y-axis), and left/right (e.g., linearly along an axis of the receive block 730 that is parallel to the x-axis). Further, three of the six DOF are rotational: pitch (e.g., rotation about the axis of the receive block 730 that is parallel to the x-axis), yaw (e.g., rotation about the axis of the optical component that is parallel to the y-axis), and roll (e.g., rotation about the axis of the optical component that is parallel to the z-axis).

Continuing with the scenario, the system 700 may adjust the position of the receive block 730, when coupled to the manipulator 762, by adjusting the forward/backward position, the up/down position, the left/right position, the pitch, the yaw, and/or the roll of the receive block 730 in line with the discussion above. In turn, the system 700 may adjust the relative position between the transmit block (not shown) of the LIDAR 704 and the receive block 730. In some embodiments, additionally or alternatively to the adjustments to the position/orientation of the receive block 730, the manipulator 762 may adjust the position/orientation of the transmit block (not shown) of the LIDAR device 704 in a similar manner. Through this process, for example, the system 700 may align one or more light sources of the LIDAR device 704 with one or more detectors of the LIDAR device 704.

In some embodiments, the system 700 may then decouple the manipulator 762 from the receive block 730 (or the transmit block), and the receive block 730 may be configured to remain at the alignment (e.g., relative position) performed by the alignment apparatus 760. By way of example, the system 700 may apply an epoxy or other adhesive to a periphery of the receive block 730 to maintain the receive block 730 at the aligned relative position to the transmit block of the LIDAR device 704. In one instance, the manipulator 762 may remain coupled to the receive block 730 until the adhesive is cured. However, other processes are possible as well for maintaining the relative position between the transmit block and the receive block 730 of the LIDAR device 704. For instance, the receive block 730 may be fastened to a housing of the LIDAR device 704 using bolts, screws, or any other device among other possibilities.

It is noted that the scenario presented above is for exemplary purposes only. Other scenarios are possible as well that may include some or all of the components of the system 700, or may include other processes than those described. A non-exhaustive list of example variations of the scenario is presented below.

In a first example, the system 700 may not include the light filter 708. For instance, the camera 706 may be configured to obtain the first image and the second image without the light filter 708 being interposed between the camera 706 and the LIDAR device 704.

In a second example, the camera 706 and the light filter 708 may be mounted separately from the LIDAR device 704. For instance, the system 700 may be implemented in an assembly line where multiple LIDAR devices such as the LIDAR device 704 are located on an assembly belt. In this instance, the camera 706, the light filter 708 and the robotic arm 760 may be mounted independently adjacent to the assembly belt, and may perform similar functions to the scenario described above to calibrate each LIDAR device in the assembly line.

In a third example, the receive block 730 may be illuminated by an auxiliary light source (not shown) similar to the auxiliary light source 170. For instance, the light filter 708 may remain interposed between the LIDAR device 704 and the camera 706 while the first image of the laser beams emitted by the LIDAR device 704 is captured by the camera 706, and while the second image of the receive block 730 is captured as well. In this instance, the receive block 730 would be visible to the camera 706 through the light filter 708 due to the illumination by the auxiliary light source with light at the source wavelength that is viewable through the light filter 708.

In a fourth example, the LIDAR device 704 may be configured to continue emitting light while the camera 106 captures the first image and the second image. For instance, the light filter 708 may alternatively attenuate the light beams having the source wavelength emitted by light sources of the LIDAR device 704. Thus, in this instance, the light filter 708 may be positioned as shown in FIG. 7B while the camera 706 is capturing the first image indicative of the light source positions. Further, in this instance, the light filter 708 may be positioned as shown in FIG. 7A while the camera 706 is capturing the second image indicative of the detector positions. Thus, various configurations of the light filter 708 may therefore affect the operation of the system 700 in line with the discussion above.

In a fifth example, the camera 706 may be configured to capture a single image instead of the first image and the second image. The single image may be indicative of both the light source positions of light sources in the LIDAR device 704, and the detector positions of detectors in the receive block 730. Referring back to FIG. 2B by way of example, the single image may capture both the light beams 204a-c and light reflected off the detectors 232a-c. As in the third example above, the receive block 730 in this example may be illuminated by an auxiliary light source such that the detectors 232a-c are viewable through the light filter 708. Other example scenarios are possible as well.

Figure 8:
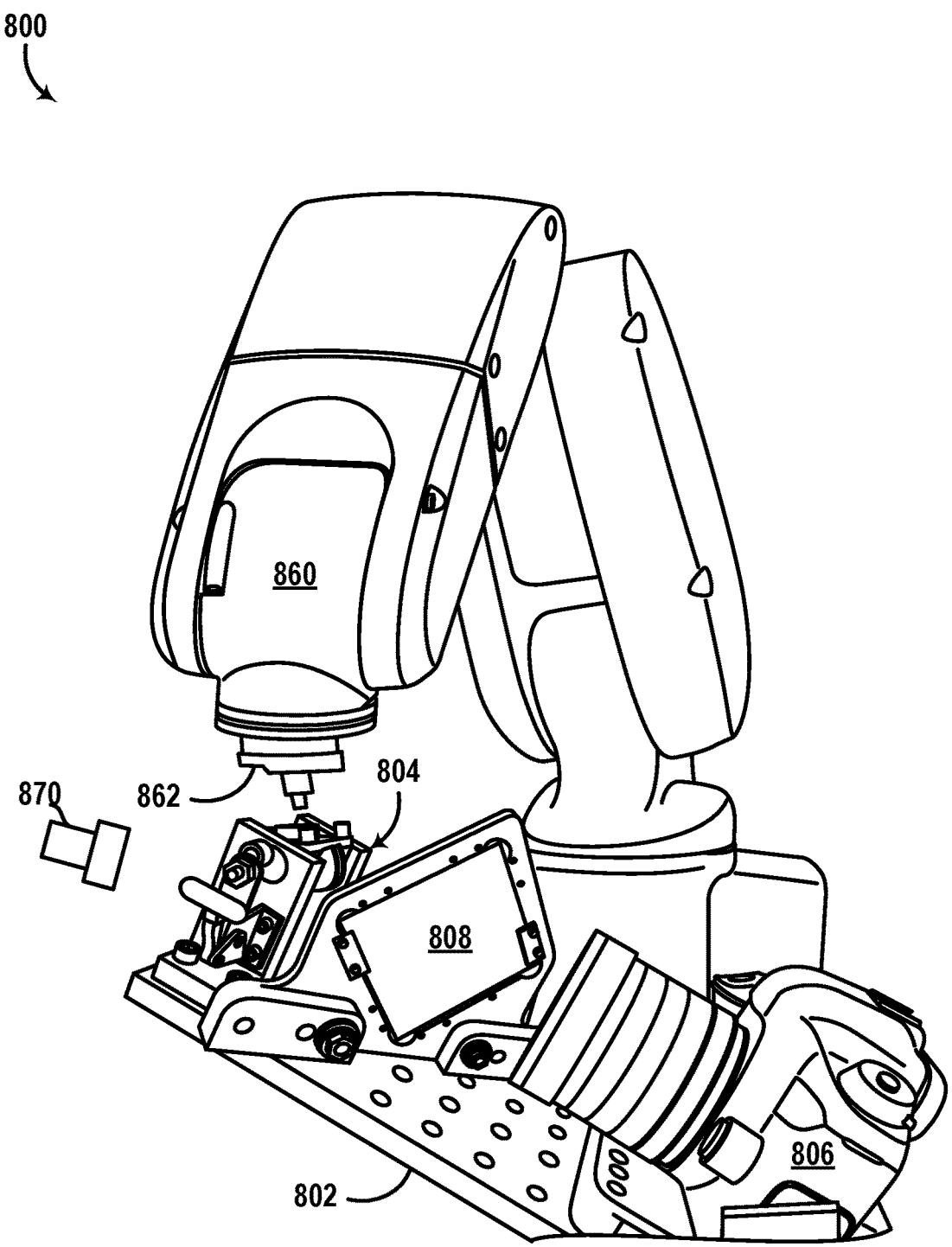
FIG. 8 illustrates another system, according to an example embodiment.

FIG. 8 illustrates another system 800, according to an example embodiment. The system 800 may be similar to the systems 100 and 700. For example, the system 800 includes a mounting platform 802, a camera 806, a light filter 808, and an alignment apparatus 860 that are similar, respectively, to the mounting platform 702, the camera 706, the light filter 708, and the alignment apparatus 760 of the system 700. The system 800 also includes a LIDAR device 804 that is similar to the LIDAR device 104 of the system 100. The system 800 also includes a manipulator 862 shaped and configured to couple the alignment apparatus 860 with one or more components of the LIDAR device 804. The system 800 also includes an auxiliary light source 870 that is similar to the auxiliary light source 170 of the system 100.

As shown, the LIDAR device 804 has a configuration similar to the LIDAR device 600 of FIGS. 6A-6C. However, in some examples, other configurations are possible as well, such as the configuration of the LIDAR device 200 among other possibilities.

As shown, the light filter 808 is interposed between the LIDAR device 804 and the camera 806. Additionally, the camera 806 is located at a given position at which the camera 806 can image light beam(s) emitted by the LIDAR device 804 and can image detector(s) (not shown) in the LIDAR device 804. Referring back to FIG. 6A by way of example, the camera 806 may be positioned to have a field-of-view facing the mirror 660 of the LIDAR device 600.

However, as shown, the system 800 does not include an actuator (e.g., actuator 712 of system 700) to move the light filter 808. Instead, the system 800 includes the auxiliary light source 870 to illuminate a receive block (not shown) of the LIDAR device 804 with light having the source wavelength of light emitted by light source(s) (not shown) in the LIDAR device 804. For instance, such illumination may allow detectors in the receive block of the LIDAR device 804 to be viewable by the camera 806 through the light filter 808. Although the auxiliary light source 870 is shown to be mounted separately from other components of the system 800, in some examples, the auxiliary light source 870 may be alternatively mounted to any of the components of the system 800, such as the alignment apparatus 860, the light filter 808, the mounting platform 802, etc. In one example, the auxiliary light source 870 may be alternatively mounted inside the LIDAR device 804. Referring back to FIG. 6C by way of example, the auxiliary light source may be alternatively mounted to a wall of the optics assembly 610. Other configurations of the auxiliary light source 870 are possible as well.

As shown, the manipulator 862 has a different shape and structure than the manipulator 762 of the system 700. Referring back to FIG. 6C by way of example, the manipulator 862 may have any shape suitable for adjusting position/orientation of the transmit block 620 and/or the receive block 630.

Thus, in some examples, the system 800 may perform similar functions as those described for the system 100 and the system 700, but may include some variations suitable for other LIDAR device configurations, such as the configuration of the LIDAR device 804.

Figure 9:
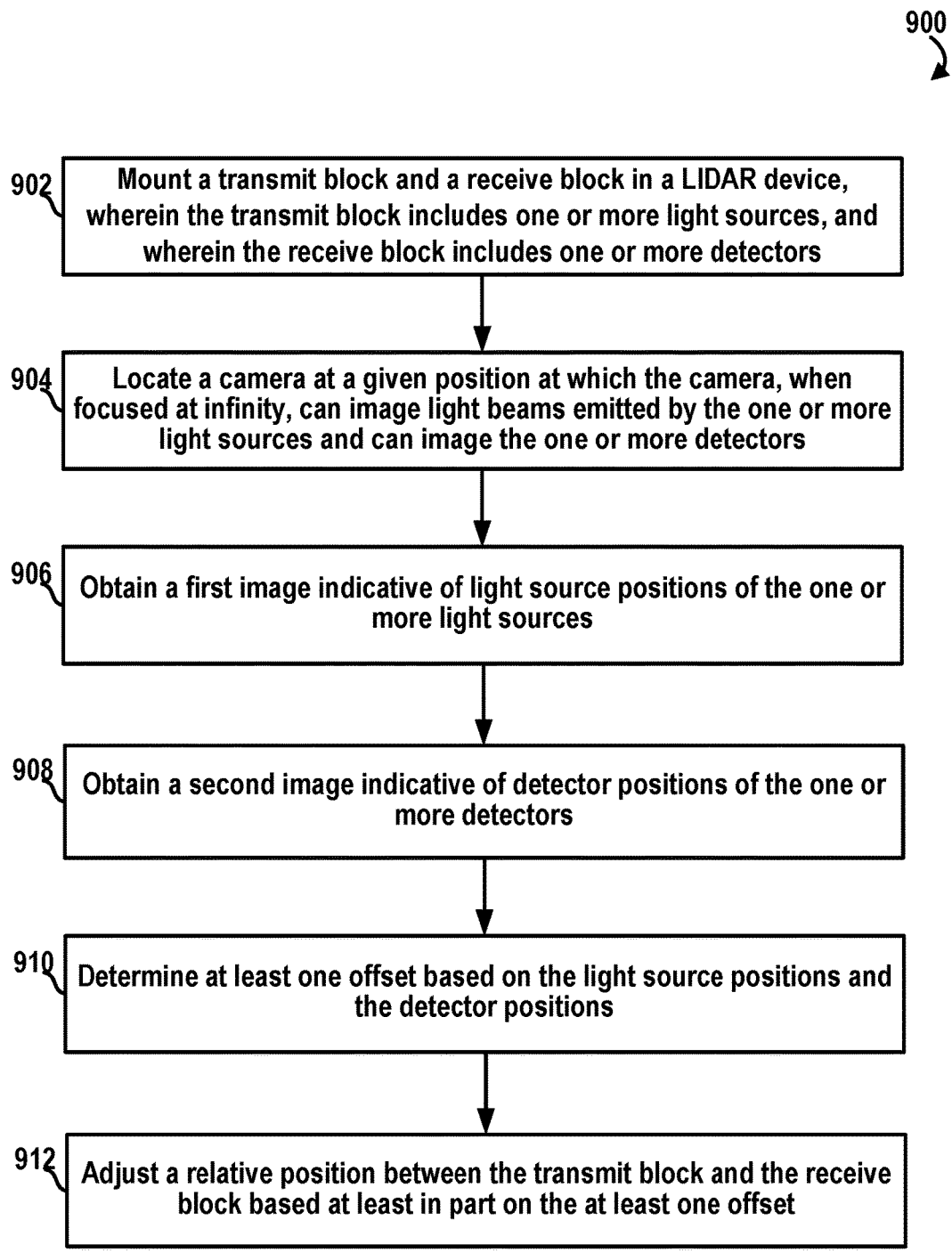
FIG. 9 is a flowchart of a method, according to an example embodiment.

FIG. 9 is a flowchart of a method 900, according to an example embodiment. Method 900 shown in FIG. 9 presents an embodiment of a method that could be used with any of the systems 100, 700, 800, the LIDAR devices 200, 600, the transmit block 320, the light source 400, and/or the receive block 530, for example. Method 900 may include one or more operations, functions, or actions as illustrated by one or more of blocks 902-912. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 900 and other processes and methods disclosed herein, each block in FIG. 9 may represent circuitry that is wired to perform the specific logical functions in the process.

At block 902, the method 900 involves mounting a transmit block and a receive block in a light detection and ranging (LIDAR) device to provide a relative position between the transmit block and the receive block. The transmit block may include one or more light sources configured to emit light at a source wavelength. The receive block may include one or more detectors configured to detect light at the source wavelength. In one embodiment, the source wavelength is 905 nm. In other embodiments, the source wavelength may be any other wavelength (e.g., infrared, ultraviolet, x-ray, visible, etc.).

By way of example, the transmit block and the receive block may be mounted by a robotic arm (e.g., alignment apparatuses 160, 760, 860, etc.) into a housing (e.g., housing 210, optics assembly 610, etc.) to provide the relative position. In this example, the relative position may be similar to the relative position between transmit block 220 and receive block 230 of FIG. 2B, or the relative position between transmit block 620 and receive block 630 of FIG. 6C, among other possibilities. However, in other examples, the mounting at block 902 may be performed by a device other than the alignment apparatus. For instance, the mounting at block 902 may correspond to an alignment (e.g., adjustment of the relative position) by a system performing the method 900 for a transmit block and a receive block that are already mounted in a LIDAR device.

In some examples, the LIDAR device may include a lens configured to (i) collimate light emitted from the one or more light sources and (ii) focus light onto the one or more detectors, similarly to the lens 250 of the LIDAR device 200. In other examples, the LIDAR device may include a transmit lens for collimation of emitted light and a receive lens for focusing received light, similarly to the transmit lens 652 and the receive lens 654 of the LIDAR device 600.

At block 904, the method 900 involves locating a camera at a given position at which the camera, when focused at infinity, can image light beams emitted by the one or more light sources and can image the one or more detectors. By way of example, the given position may be similar to the position of the camera 706 of the system 700. For instance, a field-of-view of the camera may be aligned with a FOV of the LIDAR device where light emitted from the one or more light sources propagates away from the LIDAR device.

At block 906, the method 900 involves obtaining a first image indicative of light source positions of the one or more light sources. The first image, for example, may be obtained using the camera located at the given position and focused at infinity. Referring back to FIG. 2B by way of example, the light source positions of the light sources 222a-c may vary according to the particular orientation and position of the transmit block 220. In turn, the direction of propagation of the light beams 204a-c may also vary, and such variation may be represented by pixels in the first image obtained by the camera.

In some examples, the method 900 may also involve obtaining the first image while the one or more light sources are emitting light at the source wavelength. For instance, a system performing the method 900 may provide power and/or instructions to the LIDAR device to emit the light at the source wavelength, and may provide instructions to the camera to capture the first image while the one or more light sources are emitting the light. Further, in some instances, the system may provide instructions to the camera to adjust the focus to infinity for the source wavelength. Alternatively, for instance, the camera may be configured to have the focus prior to capturing the first image.

In some examples, the method 900 may also involve obtaining the first image while a light filter is interposed between the camera and the one or more light sources. The light filter may be similar to the light filters 108, 708, or 808. In one example, the light filter may be configured to attenuate light having wavelengths other than the source wavelength. In this example, the first image may be more suitable for representing features of the emitted light beams at the source wavelength. In another example, the light filter may be configured to attenuate light within a wavelength range that includes the source wavelength. In this example, the light filter may reduce the intensity of the emitted light to protect components of the camera. Additionally or alternatively, in this example, the light filter may reduce an amount of light propagating toward the camera that has wavelengths proximal to the source wavelength. In turn, for instance, pixels in the first image representing the emitted light beams having the source wavelength may be easily contrasted from surrounding pixels having proximal wavelengths.

In some examples, the method 900 may also involve detecting a defect in a light source based on the first image. In one example, the first image may indicate that one or more of the light sources in the transmit block has a different intensity, brightness, color, or other characteristic compared to other light sources. For instance, a system performing method 900 may compare pixel properties (e.g., brightness, intensity, color, etc.) associated with one light source against other pixel properties in the first image associated with another light source. Alternatively, for instance, the system may compare the pixel properties of the light source with pre-determined pixel properties or pixel properties in a stored image among other possibilities.

In some examples, the method 900 may also involve detecting an aberration in an optical element optically coupled to a light source based on the first image. Referring back to FIGS. 4A-4C by way of example, the light source may be coupled to an optical element such as the cylindrical lens 404. In this example, the system performing the method 900 may detect the aberration in such optical element by examining the shape or other properties of pixels in the first image that are associated with a light beam from the light source (e.g., compare with other pixels, compare with stored parameters/image, etc.). Thus, in some embodiments, the method 900 may allow diagnosis of light source(s) in the LIDAR device.

At block 908, the method 900 involves obtaining a second image indicative of detector positions of the one or more detectors. Similarly to the first image, the second image may be obtained using the camera located at the given position and focused at infinity. Referring back to FIG. 2B by way of example, the second image may represent the detectors 232a-c that are viewable to the camera via the lens 250 and the mirror 242. Referring back to FIGS. 6A-6C as another example, the second image may represent the detector 632 that is viewable to the camera via the lens 654 and the mirror 660. Thus, in some embodiments, the camera may obtain the first image and the second image while the camera is located at the same given position.

In some examples, the method 900 may also involve obtaining the second image while the one or more light sources are not emitting light at the source wavelength. For instance, a system performing the method 900 may reduce power to the one or more light sources and/or provide instructions to the LIDAR device to stop emitting light beams.

However, in other examples, the method 900 may involve obtaining the second image while the one or more light sources are emitting the light at the source wavelength. In one instance, a light filter may be interposed between the camera and the LIDAR device while the camera is capturing the second image, and the light filter may be configured to attenuate light at the source wavelength emitted by the one or more light sources. In this instance, the system performing the method 900 may then obtain the second image indicative of the detector positions while the light filter attenuates the light beams emitted by the one or more light sources. In another instance, the second image may indicate both the light source positions and the detector positions since the one or more light sources are emitting the light at the source wavelength when the second image is obtained. Other examples are possible as well.

In some examples, the method 900 may also involve obtaining the second image while the one or more detectors are illuminated with light at the source wavelength from an auxiliary light source. The auxiliary light source may be similar to the auxiliary light sources 170 and 870 included, respectively, in the systems 100 and 800. In one example, the camera may be focused at infinity for the source wavelength. In another example, a light filter interposed between the camera and the LIDAR device may be configured to attenuate light having wavelengths other than the source wavelength. In both examples, the auxiliary light source may illuminate the one or more detectors such that reflections of the illuminating light having the source wavelength are viewable by the camera when capturing the second image.

At block 910, the method 900 involves determining at least one offset based on the light source positions indicated by the first image and the detector positions indicated by the second image. In one example, the at least one offset may include distances between adjacent regions of the first image that are associated with particular light sources. In another example, the at least one offset may include distances between adjacent regions of the second image that are associated with particular detectors. In yet another example, the at least one offset may include an offset between a region of the first image associated with a given light source, and a corresponding region of the second image associated with a given detector. The offset in the third example may have a horizontal component and a vertical component, or may just be a distance between the respective regions (e.g., number of pixels). As a variation of the third example, the offset may also include a depth component where the camera is configured to obtain 3D images, for instance. Other offsets are possible as well.

In some examples, the method 900 may also involve generating a composite image based on overlaying the first image and the second image. In these examples, the at least one offset may be determined based on separation between one or more pixels in the composite image associated with a light source and one or more pixels in the composite image associated with a corresponding detector.

At block 912, the method 900 includes adjusting a relative position between the transmit block and the receive block based at least in part on the at least one offset. By way of example, a robotic arm or other device (e.g., alignment apparatuses 160, 760, 860, etc.) may couple to the transmit block and/or the receive block to adjust the relative position. The robotic arm, for instance, may translate the coupled component linearly and/or rotate the coupled component about an axis in line with the discussion for the systems 100, 700, and 800.

Accordingly, in some examples, the method 900 may also involve adjusting the relative position between the transmit block and the receive block by rotating the receive block about an axis. Further, in some examples, the method 900 may also involve adjusting the relative position by rotating the transmit block about an axis.

In some examples, adjusting the relative position between the transmit block and the receive block at block 912 reduces the at least one offset. For instance, where the at least one offset includes an offset between a light source and a corresponding detector, the adjustment of the relative position may reduce the offset to align the light source with the detector. In other examples, adjusting the relative position between the transmit block and the receive block at 912 causes the at least one offset to correspond to a particular offset. For instance, where the at least one offset includes an offset between two adjacent light sources, the adjustment of the relative position may cause the offset to correspond to the particular offset.

Figure 10:
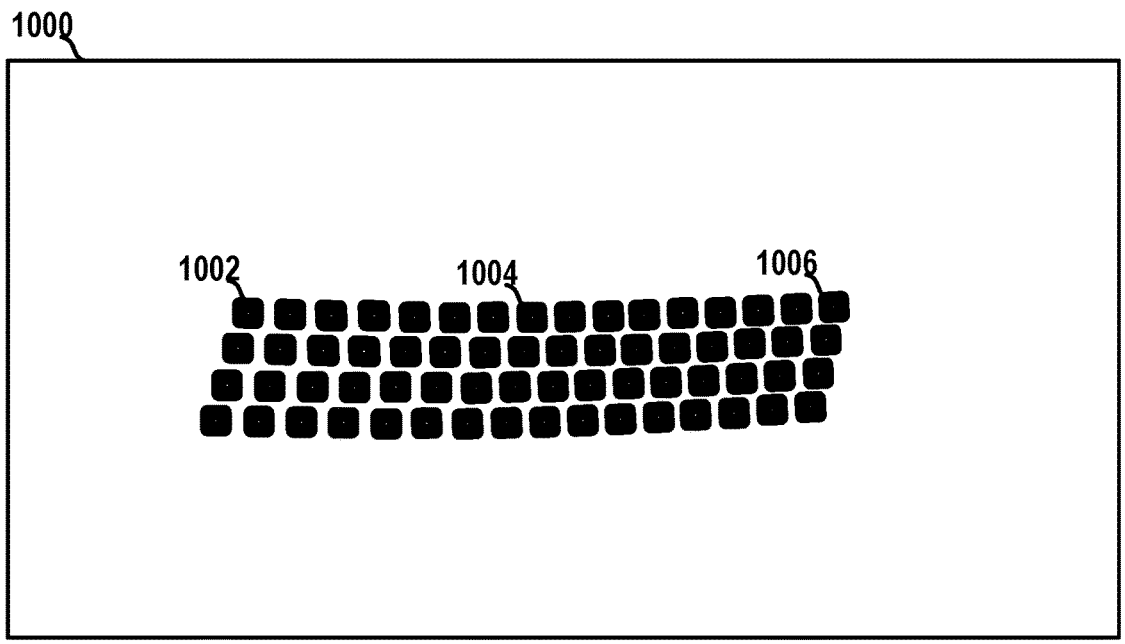
FIG. 10 illustrates an image indicative of light source positions, according to an example embodiment.

FIG. 10 illustrates an image 1000 indicative of light source positions of light sources in a transmit block of a LIDAR device, according to an example embodiment. The image 1000 may be similar to the first image described at block 906 of the method 900. For instance, dark pixels in the image 1000 may represent light beams emitted by one or more light sources in a transmit block. Referring back to FIG. 3 by way of example, each of regions 1002, 1004, 1006 in the image 1000 may correspond, respectively, to light beams 302a, 302b, 302c emitted by light sources 322a, 322b, 322c of the transmit block 320.

Figure 11:
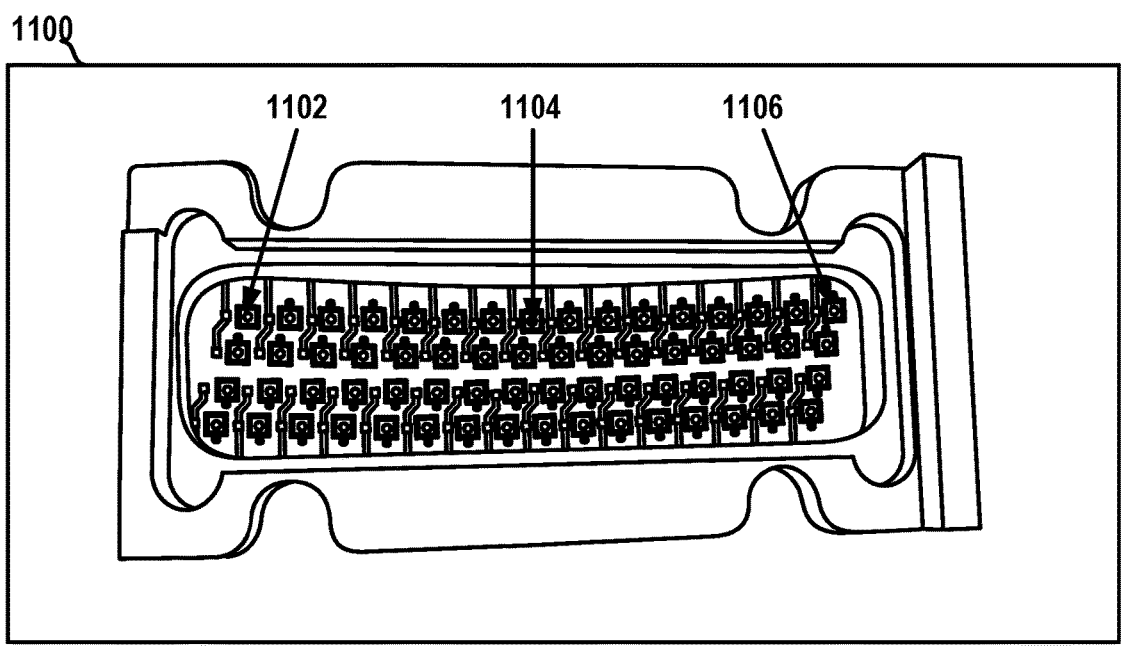
FIG. 11 illustrates an image indicative of detector positions, according to an example embodiment.

FIG. 11 illustrates an image 1100 indicative of detector positions of detectors in a receive block, according to an example embodiment. The image 1100 may be similar to the second image described at block 908 of the method 900. Referring back to FIG. 5A by way of example, regions 1102, 1104, 1106 in the image 1100 may correspond, respectively, to the detectors 532a, 532b, 532c of the receive block 530.

Figure 12:
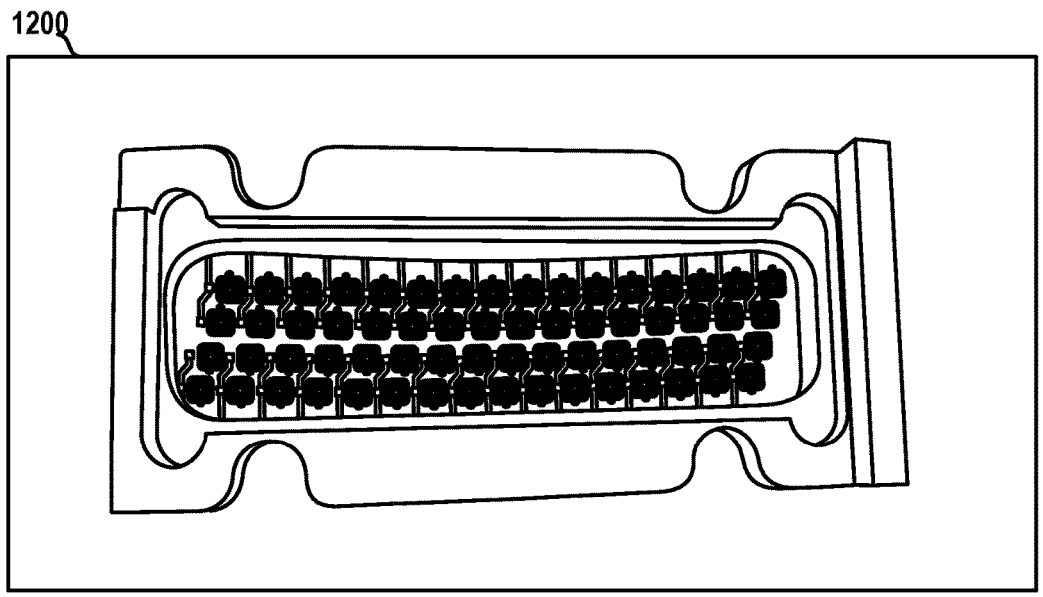
FIG. 12 illustrates an image in a scenario where light sources and detectors are aligned, according to an example embodiment.

FIG. 12 illustrates an image 1200 in a scenario where light sources in a transmit block and detectors in a receive block of a LIDAR device are aligned, according to an example embodiment. For example, the image 1200 may correspond to a composite image generated by overlaying the image 1000 and the image 1100, in line with the discussion at block 910 of the method 900.

However, in some examples, light sources and detectors in a LIDAR device may not be aligned with one another due to manufacturing/assembly variability or other factors.

Figure 13:
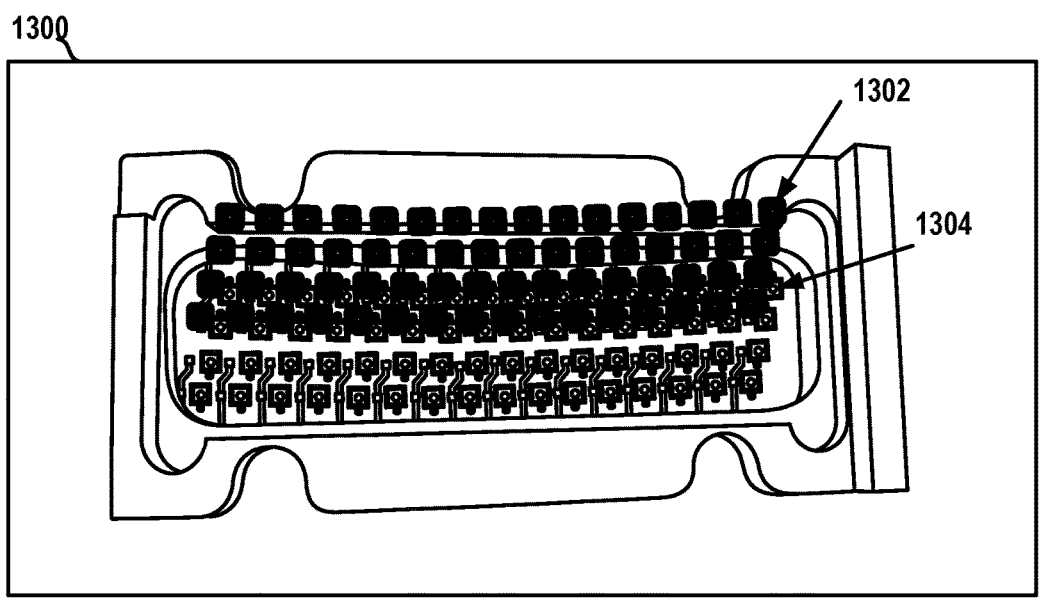
FIG. 13 illustrates an image in a scenario where light sources and detectors have an up/down offset, according to an example embodiment.

FIG. 13 illustrates an image 1300 in a scenario where the light sources and the detectors of a LIDAR device are misaligned along the up/down DOF described in the discussion of FIG. 7C, according to an example embodiment. Image 1300 may be a composite image determined similarly to the image 1200. For instance, region 1302 may correspond to region 1006 of the image 1000, and region 1304 may correspond to region 1106 of the image 1100. In turn, the at least one offset determined at block 910 of the method 900 may correspond to a distance (e.g., pixel distance, etc.) between the region 1302 and the region 1304, and a system (e.g., system 700, etc.) may perform the adjustment of the relative position between the transmit block and the receive block to align the light source associated with region 1302 with the detector associated with region 1304. By way of example, the system may adjust the up/down position of the transmit block and/or the up/down position of the receive block to reduce the determined offset, in line with the discussion above.

Figure 14:
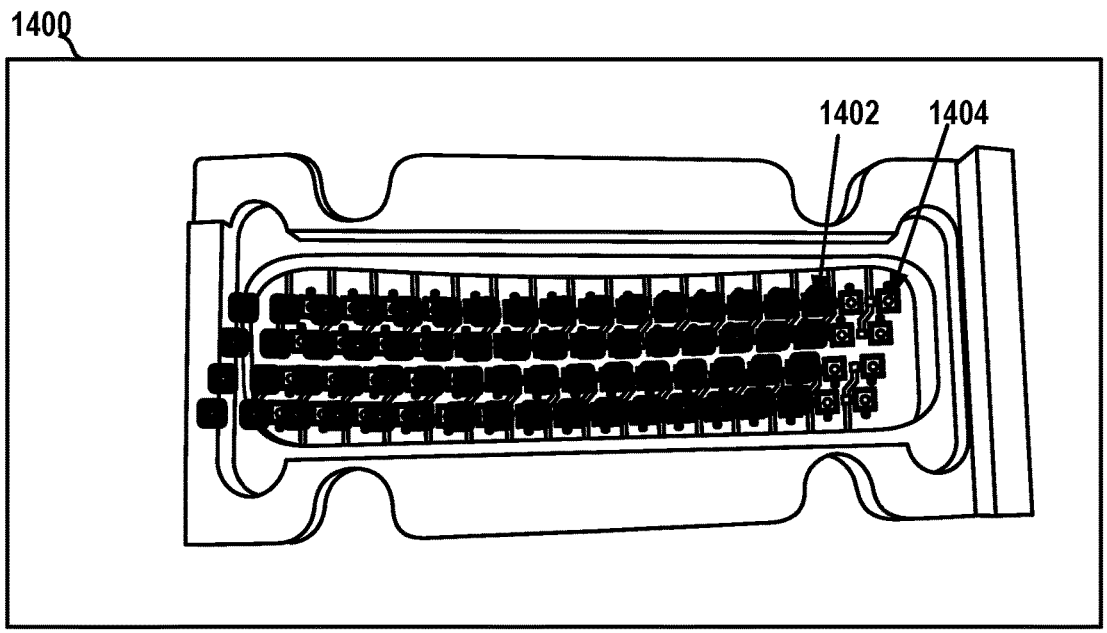
FIG. 14 illustrates an image in a scenario where light sources and detectors have a left/right offset, according to an example embodiment.

FIG. 14 illustrates an image 1400 in a scenario where the light sources and the detectors of the LIDAR device are misaligned along the left/right DOF described in the discussion of FIG. 7C, according to an example embodiment. As a variation of the discussion for image 1300, an offset in the LIDAR device of image 1400 may correspond to the distance between the regions 1402 (e.g., associated with a light source) and 1404 (e.g., associated with a corresponding detector).

Figure 15:
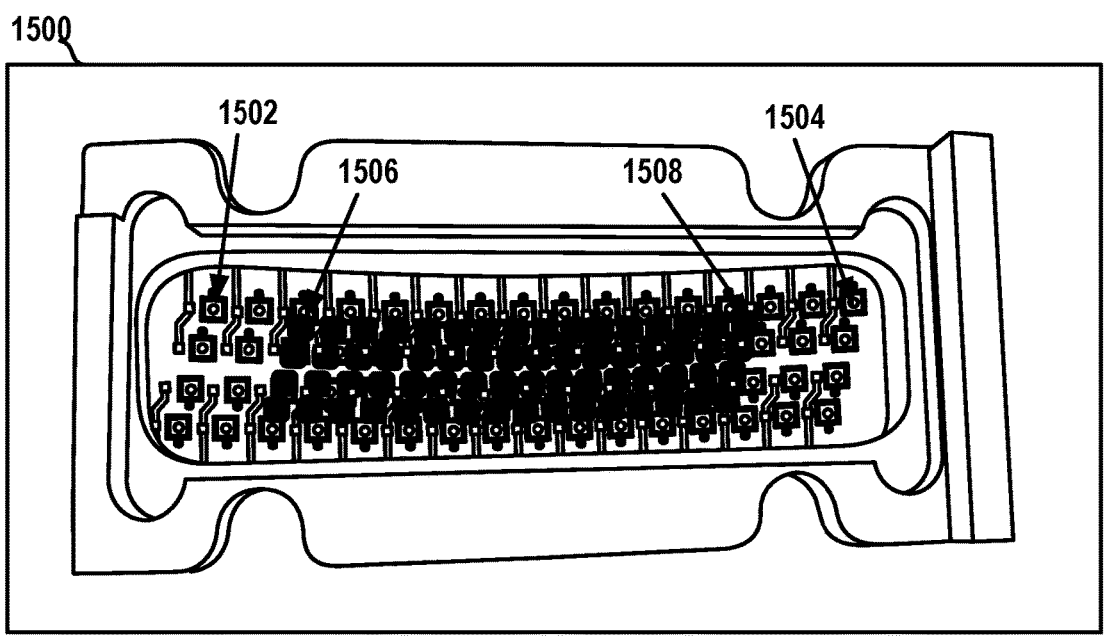
FIG. 15 illustrates an image in a scenario where light sources and detectors have a forward/backward offset, according to an example embodiment.

FIG. 15 illustrates an image 1500 in a scenario where the light sources and the detectors are misaligned along the forward/backward DOF, according to an example embodiment. For instance, as shown in image 1500, the regions that correspond to light source positions appear smaller and closer to one another, than the regions that correspond to detector positions. Similarly here, one or more offsets according to block 910 of the method 900 may be determined. An example offset may be a ratio between: (i) the distance between region 1502 and 1504 (e.g., particular detector positions), and (ii) the distance between regions

1506 and 1508 (e.g., corresponding light source positions). However, other offsets are possible as well such as offsets determined by various image processing algorithms to detect differences in sizing or depth among other possibilities.

Figure 16:
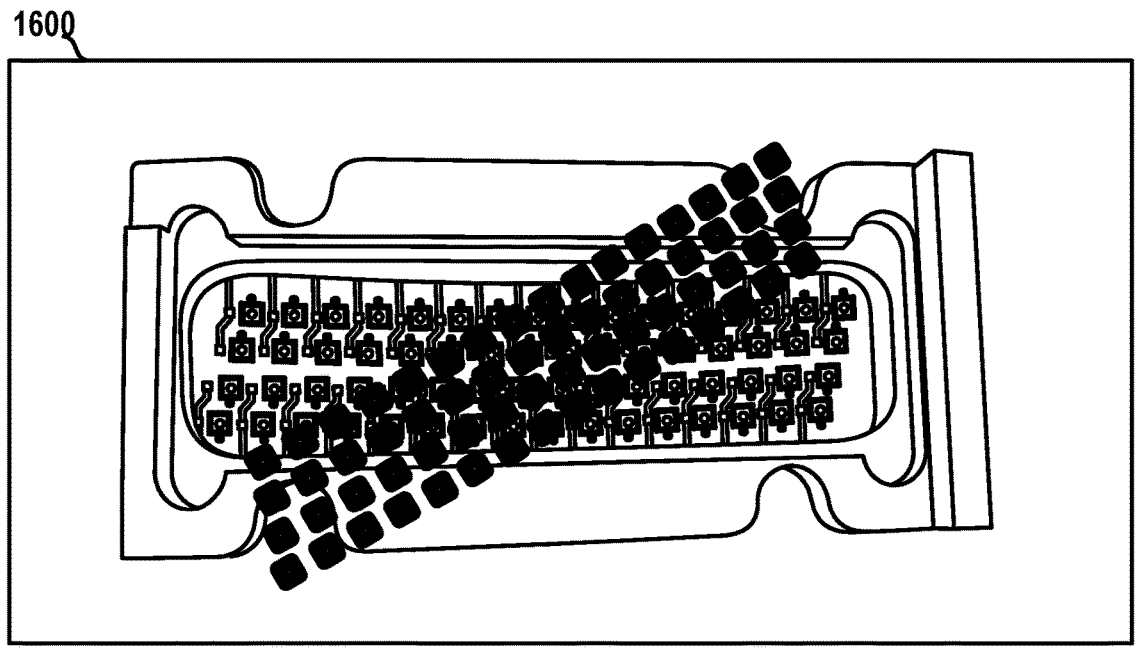
FIG. 16 illustrates an image in a scenario where light sources and detectors have a roll offset, according to an example embodiment.

FIG. 16 illustrates an image 1600 in a scenario where the light sources and the detectors are misaligned along the roll DOF described in FIG. 7C, according to an example embodiment. Similarly here, the offset between the roll position of the light sources and the roll position of the detectors may be determined. For instance, an image processing algorithm may determine such offset, and a system of the present method may adjust the relative position between the transmit block and the receive block accordingly. Alternatively, for instance, manual operation of a robotic arm may be employed by visual inspection of the image 1600 (e.g., video feed, etc.) to adjust the relative position between the transmit block and the receive block, among other possibilities.

Figure 17:
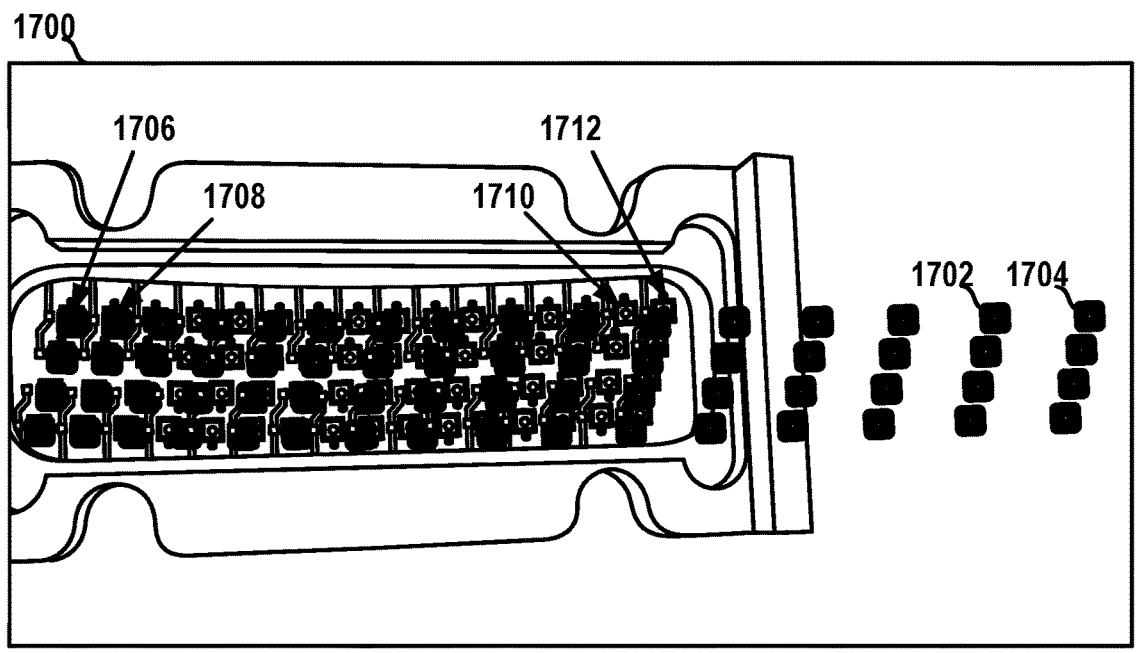
FIG. 17 illustrates an image in a scenario where light sources and detectors have a yaw offset, according to an example embodiment.

FIG. 17 illustrates an image 1700 in a scenario where the light sources and detectors are misaligned along the yaw DOF described in FIG. 7C, according to an example embodiment. For instance, as shown, light beams from light sources at a right side of the image 1700 (e.g., associated with regions 1702 and 1704) are at a greater distance (e.g., offset) to one another than light sources at a left side of the image 1700 (e.g., associated with regions 1706 and 1708). This variation may be due to the yaw of the transmit block. In contrast, distances between adjacent corresponding detectors (e.g., associated with regions 1710 and 1712) do not exhibit the same variation, due to the receive block having a different yaw. Thus, in some examples, the present method may adjust the yaw of the receive block to correspond to the yaw of the transmit block. Alternatively or additionally, in some examples, the present method may adjust the yaw of the transmit block to correspond to the yaw of the receive block.

Figure 18:
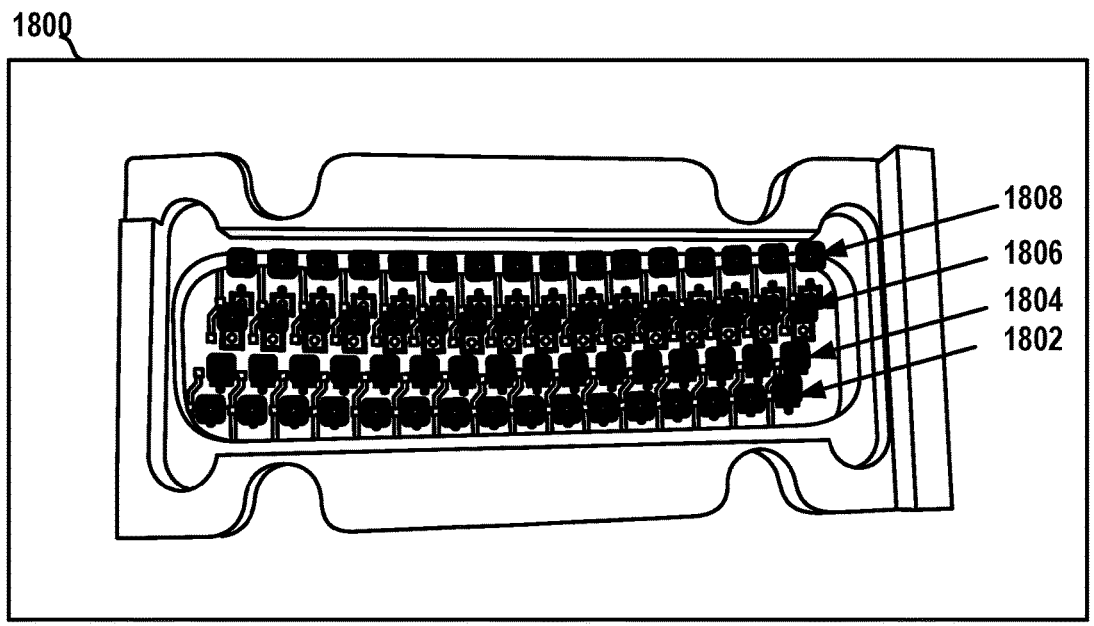
FIG. 18 illustrates an image in a scenario where light sources and detectors have a pitch offset, according to an example embodiment.

FIG. 18 illustrates an image 1800 in a scenario where the light sources and detectors are misaligned along the pitch DOF described in FIG. 7C, according to an example embodiment. Similarly to the discussion above for the yaw misalignment in image 1700, the transmit block in this scenario has a pitch orientation that is different from the pitch orientation of the receive block. For instance, a distance (e.g., offset) between light beams indicated by regions 1802 and 1804 is different from the distance between light beams indicated by regions 1806 and 1808, due to the pitch of the transmit block. Further, corresponding detectors for those light beams are not similarly separated in the image 1800, which indicates that the receive block has a different pitch than the pitch of the transmit block. In turn, similarly to the discussion above for image 1700, the present method may adjust the pitch of the transmit block, the receive block, or both, to align the transmit block with the receive block, in line with the discussion at block 912 of the method 900.

Although images 1200-1800 illustrate composite images overlaying a first image (e.g., image 1000, etc.) with a second image (e.g., image 1100), in some examples, the present method may determine the various offsets described above for images 1200-1800 without overlaying the two images. For instance, a computing device herein may determine the various offsets by comparing pixel locations in the first image 1000 with corresponding pixel locations in the second image 1100. Other image processing techniques are possible as well (e.g., filtering, transforms, etc.) for determining the at least one offset described at block 910 of the method 900.

Further, although images 1300-1800 illustrate scenarios where the light sources and the detectors are offset in only one DOF, in some examples, the light sources and the detectors may be offset in more than one DOF. For instance, a LIDAR device may have light sources and detectors that are offset in both the forward/backward DOF described in image 1500 and the roll DOF described in image 1600. Other offset combinations are possible as well.

Further, although images 1000-1800 represent light sources and detectors of a LIDAR device having a similar configuration to the LIDAR device 200, in some examples, similar images may be generated for any other LIDAR device configuration, such as the configuration of the LIDAR device 600 among other possibilities.

Figure 19:
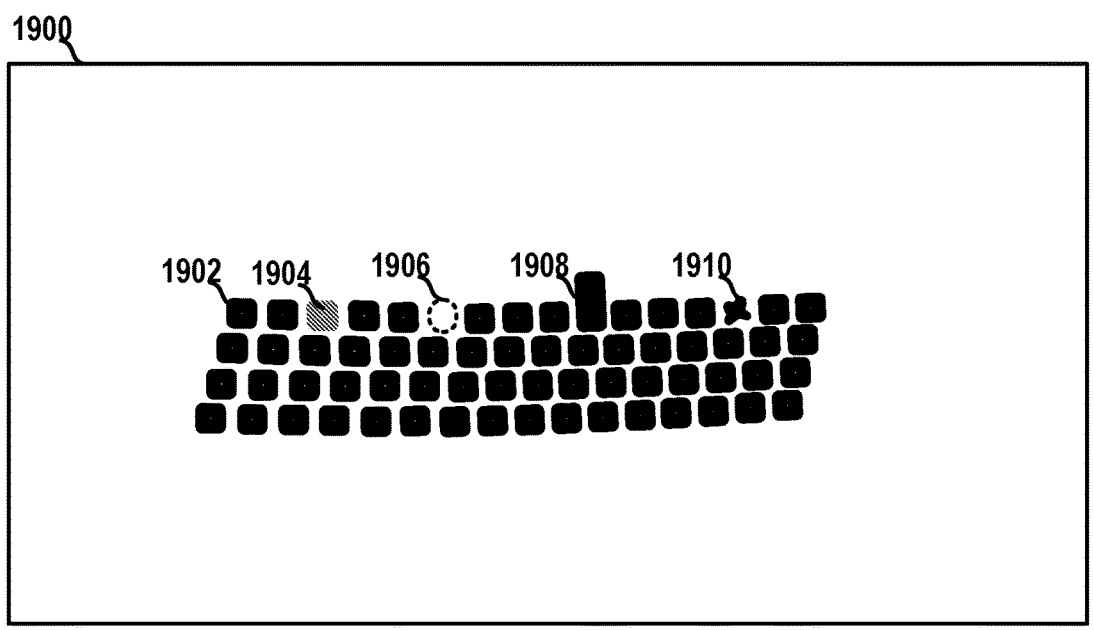
FIG. 19 illustrates an image indicative of a defect or an aberration, according to an example embodiment.

In addition to alignment of light sources and detectors of a LIDAR device, in some examples, the present method may facilitate diagnosis of the various components of the LIDAR device. As an example, FIG. 19 illustrates an image 1900 indicative of a defect or an aberration. Image 1900 is an example image of light beams from a transmit block, similarly to the image 1000. For instance, region 1902 of image 1900 may correspond to a light beam from a light source, similarly to region 1002 of the image 1000. In one example, region 1904 may represent a light beam from a defective light source. For instance, pixels in region 1904 may have a different color, brightness, intensity, or any other characteristic than pixels in other similar regions (e.g., region 1902), due to a defect in the light source associated with region 1904. In another example, region 1906 may be a region where a light beam from a light source is expected, and therefore the associated light source may also be defective. In yet another example, regions 1908 and 1910 appear distorted compared to similar regions (e.g., region 1902). In turn, for instance, such distortions may indicate that optical elements (e.g., cylindrical lens 404 of FIGS. 4B-4C, etc.) coupled to light sources associated with regions 1908 and 1910 may have aberrations, and the present method may therefore detect the aberrations. Other example defects and aberrations are possible as well. In some examples, the present method may detect the various defects/aberrations described above by comparing the various regions 1904-1910 with similar regions in the image 1900 (e.g., region 1902, etc.). Additionally or alternatively, in some examples, the present method may detect the various defects/aberrations by comparing the image 1900 with a stored image (e.g., image 1000).

Figure 20:
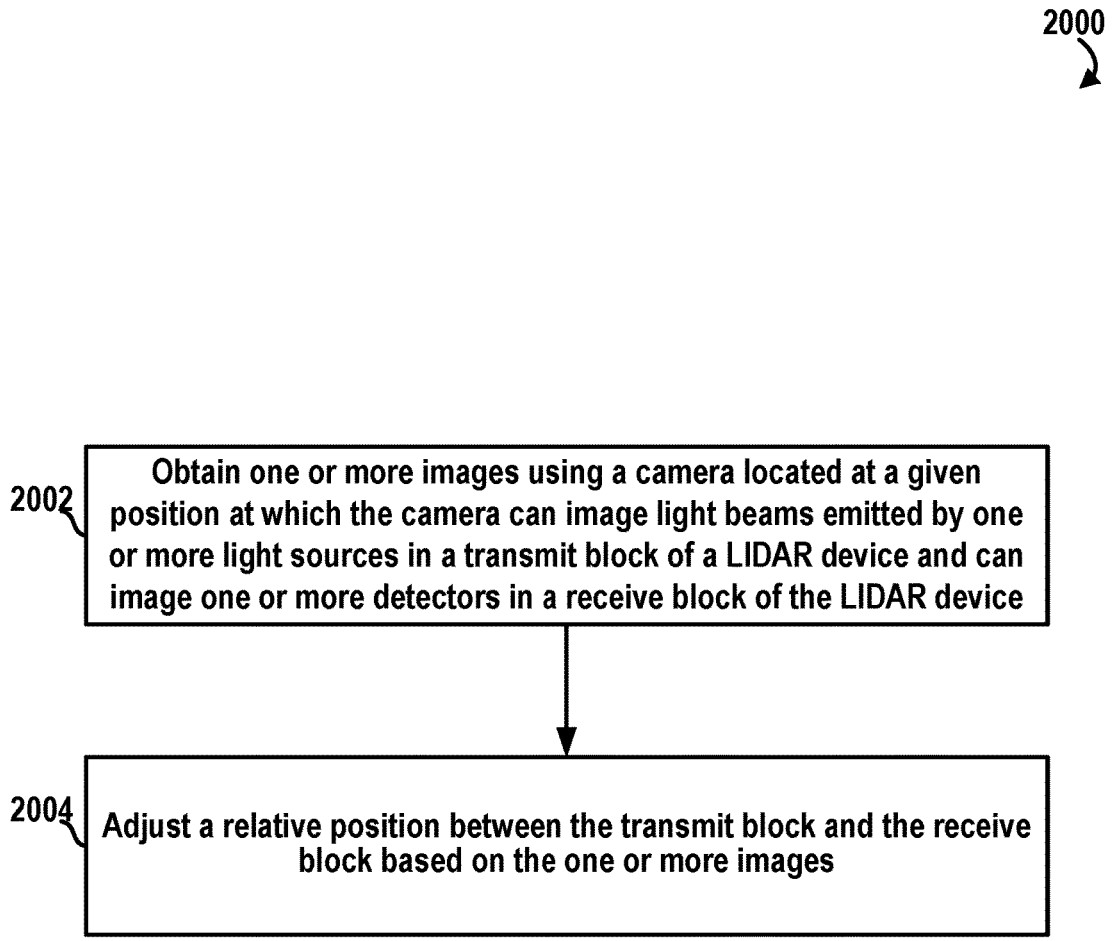
FIG. 20 is a flowchart of another method, according to an example embodiment.

FIG. 20 is a flowchart of another method 2000, according to an example embodiment. Method 2000 shown in FIG. 20 presents an embodiment of a method that could be used with any of the systems 100, 700, 800, the LIDAR devices 104, 200, 600, 704, 804, the transmit block 320, the light source 400, and/or the receive block 530, for example. Method 2000 may include one or more operations, functions, or actions as illustrated by one or more of blocks 2002-2004. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 2002, the method 2000 involves obtaining one or more images using a camera located at a given position at which the camera can image light beams emitted by one or more light sources in a transmit block of a LIDAR device and can image one or more detectors in a receive block of the LIDAR device. In some examples, the one or more images may include a single image that indicates both light source positions of the one or more light sources and detector positions of the one or more detectors. For instance, the single image may be similar to images 1200-1800 shown in FIGS. 12-18. In other examples, the one or more images may include a first image indicative of the light source positions and a second image indicative of the detector positions, similarly to the first image and the second image described, respectively, at blocks 906 and 908 of the method 900.

In some examples, the method 2000 may also involve causing an actuator to move a light filter to a first position where the light filter is interposed between the camera and the LIDAR device, obtaining a first image indicative of light source positions of the one or more light sources while the light filter is at the first position, causing the actuator to move the light filter to a second position where the light filter is outside a field-of-view of the camera, and obtaining a second image indicative of detector positions of the one or more detectors while the light filter is at the second position. Referring back to FIGS. 7A and 7B by way of example, the actuator, the light filter, and the camera may correspond, respectively, to the actuator 712, the light filter 708, and the camera 706. Thus, in this example, the method 2000 may adjust the position of the light filter 708 to the first position illustrated in FIG. 7A to obtain the first image, and to the second position illustrated in FIG. 7B to obtain the second image.

At block 2004, the method 2000 involves adjusting a relative position between the transmit block and the receive block based on the one or more images. For instance, the adjustment at block 2004 may be similar to the adjustments described at block 912 of the method 900, along some or all the six DOF (e.g., up/down, left/right, forward/backward, roll, yaw, pitch) of the transmit block, the receive block, or both. Through this process, for instance, the present method may align the one or more light sources with the one or more detectors.

In some scenarios, the process described for yaw or pitch alignment in the description of images 1700 and 1800 is less suitable than other methods herein. As an example, the variation in distances between adjacent light sources indicated by a first image (e.g., image 1000) and the variation in distances between adjacent detectors indicated by a second image (e.g., image 1100) may be insufficient for detection of yaw or pitch offsets between the transmit block and the receive block. For instance, the one or more detectors (or the one or more light sources) may be arranged closely to one another. As another example, the transmit block and the receive block may only include, respectively, one light source and one detector, similarly to the transmit block 620 and the receive block 630 shown in FIG. 6C. Thus, in this example, there may be no adjacent light sources or adjacent detectors for the determination of the offsets described in the description of images 1700 and 1800. Accordingly, in some embodiments, alternative or additional processes for rotational position alignment (e.g., yaw, pitch, roll) are presented below.

In one embodiment, the receive block may be coupled to a half-mirror positioned along a receive path of the receive block. Referring back to FIG. 2B by way of example, the half-mirror may correspond to the entrance aperture 234 and may be configured to reflect at least a portion of light incident on the half-mirror, and the receive path may correspond to receive path 208. Further, in this embodiment, the camera may be coupled to at least two light sources positioned along a periphery of a camera lens of the camera. The at least two light sources may be configured to emit light toward the LIDAR device. Further, in this embodiment, the method 2000 may also involve causing the at least two light sources to emit light pulses, and obtaining a third image from the camera indicative of reflections of the emitted light pulses off the half-mirror. In one instance, the method 2000 may also involve determining offsets between the reflections indicated by the third image, and determining the rotational position adjustment accordingly. In another instance, the method 2000 may alternatively involve comparing the third image with a stored image, and adjusting the relative position based on the comparison. For example, the stored image may indicate particular pre-determined offsets between the reflected light pulses that correspond to a particular yaw, pitch, or roll of the receive block. In this example, the method 2000 may adjust the relative position to achieve the particular offsets.

In another embodiment, the method 2000 may additionally or alternatively involve actuating at least two probes adjacent to the receive block toward the receive block. A given probe (e.g., force sensor, proximity sensor, etc.) may be configured to provide a signal indicative of contact (or proximity) between the given probe and the receive block. In this embodiment, adjusting the relative position may comprise rotating the receive block (e.g., adjusting yaw, pitch, or roll of the receive block) such that at least two signals from the at least two probes are provided at a substantially same time. For instance, the at least two probes may have a particular yaw or pitch substantially similar to the yaw or pitch of the transmit block, and thus by providing the at least two signals at the substantially same time, the yaw or pitch of the receive block may also correspond to the yaw or pitch of the transmit block.

Figure 21:
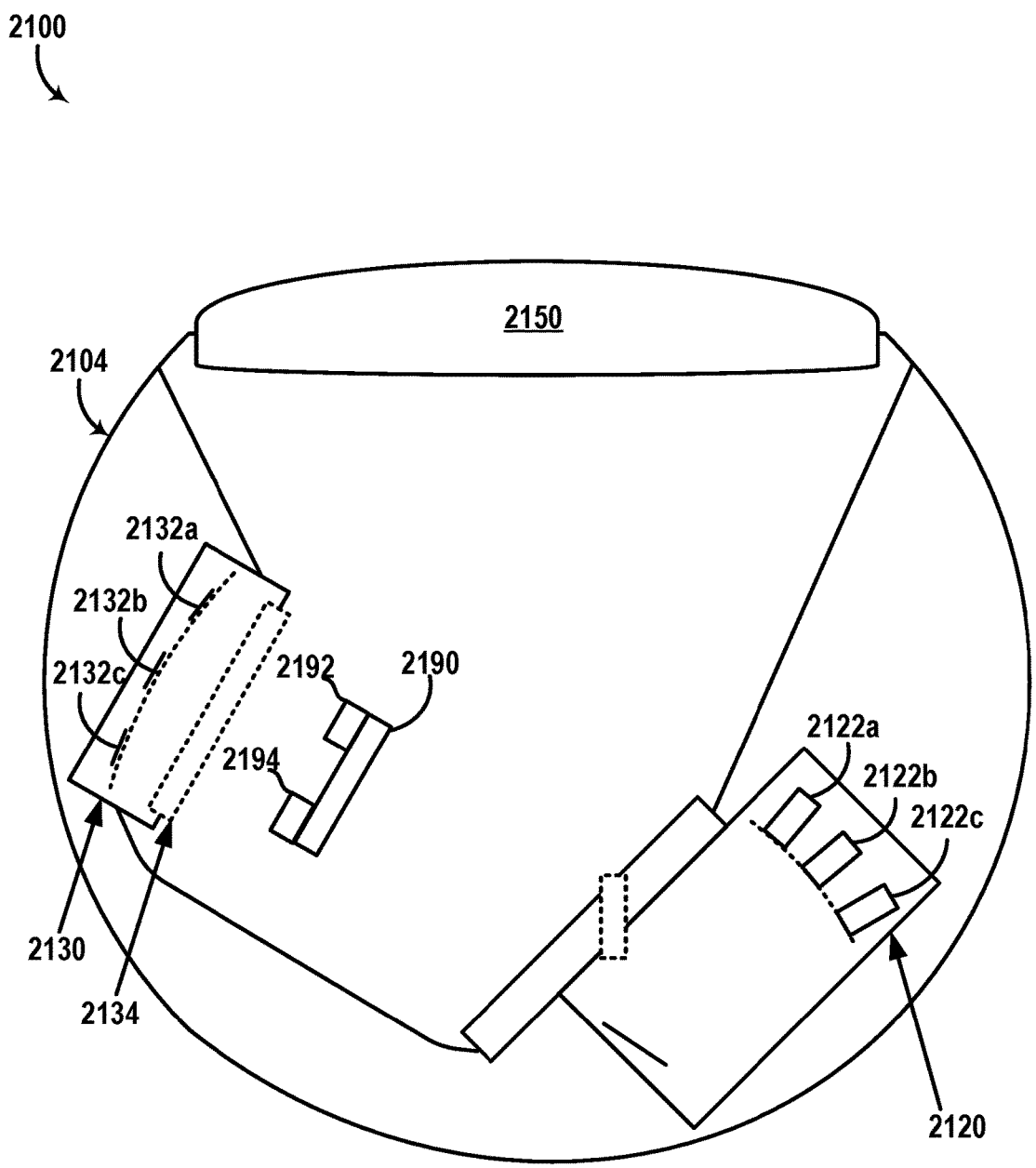
FIG. 21 illustrates a partial cross-section view of yet another system, according to an example embodiment.

FIG. 21 illustrates a partial cross-section view of yet another system 2100, according to an example embodiment. The system 2100 may be similar to any of the systems 100, 700, or 800. For instance, as shown, the system 2100 includes a LIDAR device 2104 that is similar to the LIDAR devices 104 and 704 the systems 100 and 700. It is noted that some components of the system 2100 (e.g., alignment apparatus, mounting platform, etc.) are omitted from the illustration of FIG. 21 for convenience in description.

As shown, the LIDAR device 2104 has a configuration similar to the LIDAR device 200. For instance, as shown, the LIDAR device 2104 includes a transmit block 2120, light sources 2122*a-c*, receive block 2130, detectors 2132*a-c*, an exit aperture 2134, and a lens 2150 that are similar, respectively, to the transmit block 220, the light sources 222*a-c*, the receive block 230, the detectors 232*a-c*, the exit aperture 234, and the lens 250 of the LIDAR device 200. However, in some examples, the system 2100 may be adapted for use with other LIDAR device configurations such as the configuration of the LIDAR device 600, etc. Further, as shown, the system 2100 includes an actuator 2190 and probes 2192-2194.

The actuator 2190 may be configured to move the probes 2192 and 2194 toward the receive block 2130 in line with the discussion above at block 2004 of the method 2000. Example actuators may include motors, pneumatic actuators, hydraulic pistons, relays, solenoids, and piezoelectric actuators among other possibilities.

The probes 2192 and 2194 may include any probes suitable for detection of the receive block 2130 in line with the discussion above at block 2004 of the method 2000. In one example, the probes 2192-2194 may include force sensors that provide a signal if the probes 2192-2194 contact the receive block 2130. In another example, the probes 2192-2194 may include proximity sensors (e.g., IR range sensors, etc.) that provide a signal if the probes 2192-2194 are within a threshold distance to the receive block 2130.

In the illustration of FIG. 21, a yaw of a component corresponds to an amount of rotation of the component about an axis of the component pointing out of the page. Further, a pitch of the component corresponds to an amount of rotation of the component about an axis of the component pointing away from the component. For instance, a pitch of the transmit block 2120 may be the amount of rotation of the transmit block 2120 about an axis perpendicular to one of the light sources 2122*a-c*, a pitch of the receive block 2130 may be the amount of rotation of the receive block 2130 about an axis perpendicular to the exit aperture 2134, and a pitch of the probe 2192 may be the amount of rotation of the probe 2192 about an axis perpendicular to the probe 2192 that is pointing toward the receive block 2130, etc.

In line with the discussion above, the system 2100 provides an example embodiment for the rotational position alignment described at block 2004 of the method 2000. Consider an example scenario where the probes 2192-2194 have a particular yaw (i.e., amount of rotation about axis pointing out of page) as shown in FIG. 21. In some examples, the particular yaw may be substantially similar to the yaw of the transmit block 2120. In one example, the probes 2192-2194 may be mounted via a mounting apparatus (not shown) to the transmit block 2120. In this example, the mounting apparatus may have a particular structure that causes the probes 2192-2194 to have a substantially similar yaw to the yaw of the transmit block 2120. In another example, the probes 2192-2194 may be mounted to an alignment apparatus (e.g., alignment apparatus 160, 760, 860, etc.) that provides the particular yaw. For instance, the system 2100 may determine the yaw of the transmit block 2120 by processing an image from a camera (not shown) in line with the description of the image 1700 of FIG. 17. In turn, for instance, the system 2100 may adjust the particular yaw of the probes 2192-2194 by utilizing a robotic arm or other device coupled to the probes 2192-2194 among other possibilities.

Continuing with the example scenario, the actuator 2190 may move the probes 2192-2194 toward the receive block 2130 in line with the discussion at block 2004 of the method 2000. On one hand, if the two probes 2192-2194 detect the receive block 2130 (e.g., provide a signal, etc.) at a substantially similar time, then the system 2100 may determine that the yaw of the receive block 2130 corresponds to the yaw of the probes 2192-2192, and therefore also corresponds to the yaw of the transmit block 2120. On the other hand, if the two probes 2192-2194 detect the receive block 2130 at substantially different times, then the system 2100 may determine that the yaw of the receive block 2130 does not correspond to the yaw of the probes 2192-2194, and therefore does not correspond to the yaw of the transmit block 2120. In this case, the system 2100 may then perform the adjustment of the relative position between the transmit block 2120 and the receive block 2130 in line with the discussion at block 912 of the method 900. Through this process, for example, the transmit block 2120 and the receive block 2130 may be aligned with one another, at least with regard to the yaw DOF.

As a variation of the example scenario, the probes 2192-2194 may be arranged vertically (e.g., along an axis pointing out of the page) instead of the arrangement shown in FIG. 21, or the system 2100 may include two additional probes (not shown) that are arranged vertically. In either case, the probes in this scenario may have a particular pitch (e.g., amount of rotation about an axis pointing away from the probes 2192-2194 toward the receive block 2130). Similarly to the previous scenario, the particular pitch may also correspond to a pitch of the transmit block 2120. Thus, in this scenario, a similar process to the previous scenario may be performed by the system 2100 to align the pitch of the receive block 2130 with the pitch of the transmit block 2120.

As a further variation of the example scenarios above, the probes 2192-2194 may be alternatively moved by the actuator 2192 toward the transmit block 2120 instead of the receive block 2130. In this scenario, the system 2100 may adjust the position of the transmit block 2120 to align the pitch and/or yaw of the transmit block 2120 with the pitch and/or yaw of the receive block 2130.

Figure 22:
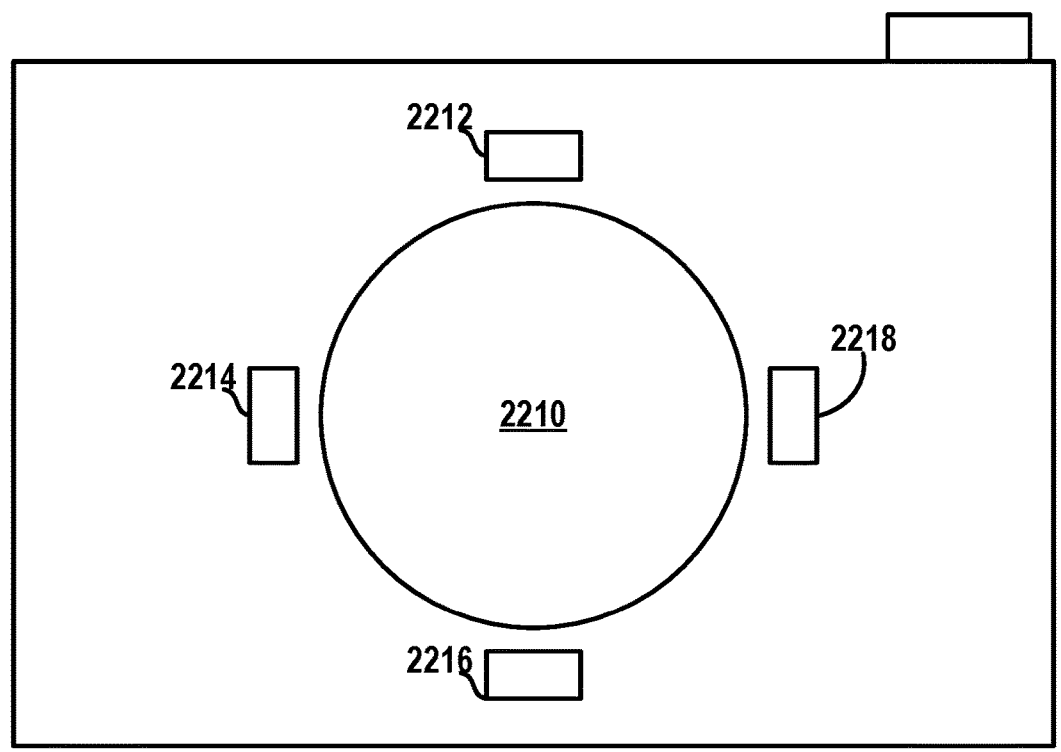
FIG. 22 illustrates a front-view of a camera, according to an example embodiment.

FIG. 22 illustrates a front-view of a camera 2206, according to an example embodiment. The camera 2206 may be similar to the cameras 106, 706, and 806 included, respectively, in the systems 100, 700, and 800. For instance, the camera 2206 may be located at a given position where the camera can capture images of light beams emitted by a LIDAR device and can capture images of detectors in the LIDAR device, similarly to the cameras 106, 706, and 806. However, in some examples, the camera 2206 may be located in other positions such as inside the housing of a LIDAR device, similarly to the probes 2192-2194 of the system 2100. In these examples, the camera 2206 may be configured to only capture images of the detectors in the LIDAR device, or may be configured to only capture images of light beams emitted by the LIDAR device, among other possibilities.

As shown, the camera 2206 includes a lens 2210 and light sources 2212, 2214, 2216, and 2218. However, in some examples, the camera 2206 may include additional, fewer, or different components than those shown. In one example, the camera 2206 may alternatively not include the lens 2210. For instance, the camera 2206 in this example may be an image sensor configured to capture images without use of the lens 2210, among other possibilities. In another example, the camera 2206 may be alternatively configured not to include the light sources 2212-2218, or may be configured to include additional or fewer light sources than the four light sources 2212-2218 shown, in accordance with the discussion at block 2004 of the method 2000.

The lens 2210 may include one or more optical element (e.g., convex lens, concave lens, Fresnel lens, mirror, etc.) arranged to modify, condition, focus, and/or redirect light incident on the lens 2210 toward imaging sensors (not shown) of the camera 2206. In some examples, the lens 2210 may be configured to provide an infinity focus for incident light having a source wavelength. In one embodiment, the source wavelength is 905 nm. However, other source wavelengths are possible as well (e.g., infrared, ultraviolet, x-ray, visible, etc.).

The light sources 2212-2218 may include laser diodes, light emitting diodes (LEDs), vertical cavity surface emitting lasers (VCSEL), organic light emitting diodes (OLEDs), polymer light emitting diodes (PLED), light emitting polymers (LEP), liquid crystal displays (LCD), microelectromechanical systems (MEMS), filament light sources, or any other device configured to selectively transmit, reflect, and/or emit light propagating away from the camera 2206. In some examples, the light sources 2212-2218 may be configured to emit light at the source wavelength of light emitted by the LIDAR device (not shown) imaged by the camera 2206. Referring back to FIG. 7A by way of example, the camera 2206 may correspond to the camera 706 of the system 700. Thus, in this example, the light sources 2212-2218 may emit light having the source wavelength that can propagate through the light filter 708 similarly to light emitted by the LIDAR device 704. However, in other examples, the light sources 2212-2218 may be configured to emit light at other wavelengths. For instance, the light filter may allow propagation of the light from the light sources 2212-2218 even if the light has other wavelengths, or the light filter may not be interposed between the camera 2206 and the LIDAR device, similarly to the configuration shown in FIG. 7B, among other possibilities.

As shown, the light sources 2212-2218 are positioned along a periphery of the camera lens 2210. However, in some examples, the light sources 2212-2218 may be alternatively positioned at a different location. In one example, referring back to FIG. 7A, the light sources 2212-2218 may be alternatively positioned along a periphery of the light filter 708. In another example, referring back to FIG. 21, the light sources 2212-2214 may be alternatively positioned within a housing of the LIDAR device 2104 similarly to the probes 2192-2194. As a variation of the previous example, the camera 2206 may be alternatively positioned inside the housing of the LIDAR device 2104 as well similarly to the actuator 2190. In yet another example, referring back to FIG. 21, the light sources 2212-2218 may be alternatively positioned at a periphery of the transmit block 2120 or at a periphery of the receive block 2130. Other positions for the light sources 2212-2218 are possible as well.

Thus, in some examples, the light sources 2212-2218 may be utilized by a system of the present method to determine the at least one offset in line with the discussion at block 910 of the method 900, and therefore facilitate the adjustment of the relative position between a transmit block and a receive block of a LIDAR device in line with the discussion at block 912 of the method 900. In one example, the light sources 2212-2218 may facilitate alignment of the rotational position (e.g., yaw, pitch, roll) of a transmit block and a receive block in line with the discussion at block 2004 of the method 2000.

As an example scenario for rotational position alignment using the camera 2206, suppose that the camera 2206 corresponds to the camera 706 of the system 700. In the scenario, the light sources 2212-2218 may be configured to emit light that propagates through the light filter 708 (e.g., if the light filter 708 is interposed between the camera 2206 and the LIDAR device 704 as illustrated in FIG. 7A). Suppose that, for the sake of example, the LIDAR device 704 has the configuration of the LIDAR device 200 shown in FIG. 2B. In this example, the light from the light sources 2212-2218 may propagate through the lens 250, and then reflect off mirror 242 onto the entrance aperture 234. Further, suppose that, in this example, the entrance aperture 234 includes a half-mirror that reflects at least a portion of the light from the light sources 2212-2218. In turn, the reflected light may reflect off the half-mirror, then reflect off the mirror 242, then propagate through the lens 250 of the LIDAR device, and then propagate into the lens 2210 of the camera 2206. At this point in the scenario, the camera 2206 may capture an image of the reflected light in line with the discussion at block 2004 of the method 2000.

Continuing with the scenario, a system of the present method may then analyze the image, in line with the discussion for images 1700-1800, using the properties (e.g., position, shape, intensity, etc.) of the light beams originating from the light sources 2212-2218 to determine yaw or pitch offsets between the transmit block and the receive block.

As a variation of the scenario above, suppose that the light sources 2212-2218 are alternatively positioned along a periphery of the transmit block 220 of the LIDAR device 200. In this scenario, four mirrors may be positioned at the positions shown for the light sources 2212-2218. In turn, the four mirrors may reflect the light from the light sources 2212-2218 towards the receive block 230 of the LIDAR device 200, and the camera 2206 may capture an image of reflections of that light off the entrance aperture 234 (e.g., half-mirror) to determine a possible yaw/pitch offset between the transmit block 220 and the receive block 230.

As another variation of the scenario, suppose that the light sources 2212-2218 are alternatively positioned along a periphery of the receive block 230 of the LIDAR device 200. In this scenario, a system of the present method may analyze an image of light from the light sources 2212-2218 in line with the discussion for images 1600-1800 to determine the rotational position (e.g., roll, yaw, pitch) of the receive block.

As yet another variation of the scenario, the light sources 2212-2218 may be alternatively positioned along a periphery of the transmit block 220 of the LIDAR device 200, and four additional similar light sources may be positioned along the periphery of the receive block 230 of the LIDAR device 200. Similarly here, one or more images of the light from the light sources 2212-2218 and the four additional light sources may be obtained from the camera 2206 and analyzed by the system of the present method to determine rotational offsets (e.g., roll, yaw, pitch) between the transmit block and the receive block. Thus, various configurations and positions are possible for the light sources 2212-2218 to facilitate optics alignment in line with the discussion above.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
obtaining a first image using a camera located at a given position outside a light detection and ranging (LIDAR) device, wherein the LIDAR device includes a transmit block and a receive block, wherein the transmit block includes one or more light sources, wherein the receive block includes one or more light detectors, and wherein the first image is indicative of light source positions of the one or more light sources;
obtaining a second image using the camera located at the given position outside the LIDAR device, wherein the second image is indicative of detector positions of the one or more light detectors;
comparing the first image with the second image to determine separation between one or more pixels associated with a light source and one or more pixels associated with a corresponding light detector; and based on at least the comparison, adjusting a mounting position of the receive block in the LIDAR device.

2. The method of claim 1, further comprising:

illuminating the one or more light detectors with an auxiliary light source, wherein obtaining the second image is while the one or more light detectors are illuminated by the auxiliary light source.

3. The method of claim 2, wherein the auxiliary light source emits light at a source wavelength, and wherein the one or more light sources of the transmit block emit light at the source wavelength.

4. The method of claim 1, wherein obtaining the first image comprises:

obtaining the first image while: (i) the one or more light sources are emitting light at a source wavelength, and (ii) a light filter is positioned within a field-of-view of the camera, wherein the light filter attenuates light within a wavelength range that includes the source wavelength.

5. The method of claim 4, wherein obtaining the second image comprises obtaining the second image while the light filter is outside the field-of-view of the camera.

6. The method of claim 4, further comprising:

prior to obtaining the first image, adjusting a position of the light filter such that the light filter is positioned within the field-of-view of the camera.

7. The method of claim 4, further comprising:

prior to obtaining the second image, adjusting the position of the light filter such that the light filter is outside the field-of-view of the camera.

8. The method of claim 1, further comprising:

causing a plurality of light sources positioned along a periphery of a camera lens of the camera to emit light pulses toward the LIDAR device;

obtaining a third image using the camera, the third image indicating reflections of the emitted light pulses; and comparing the third image with a stored image, wherein adjusting the mounting position of the receive block is further based on the comparison of the third image with the stored image.

9. The method of claim 1, further comprising:

actuating a plurality of probes toward the receive block, wherein a given probe of the plurality is configured to detect contact between the given probe and the receive block, and wherein adjusting the mounting position of the receive block comprises causing an actuator to move the receive block until at least two of the plurality of probes detect the receive block at a same time.

10. A method comprising:

obtaining a first image using a camera located at a given position outside a light detection and ranging (LIDAR) device, wherein the LIDAR device includes a transmit block and a receive block, wherein the transmit block includes one or more light sources, wherein the receive block includes one or more light detectors, and wherein the first image is indicative of light source positions of the one or more light sources;

obtaining a second image using the camera located at the given position outside the LIDAR device, wherein the second image is indicative of detector positions of the one or more light detectors;

comparing the first image with the second image to determine separation between one or more pixels associated with a light source and one or more pixels associated with a corresponding light detector; and based on at least the comparison, adjusting a mounting position of the transmit block in the LIDAR device.

11. The method of claim 10, further comprising:

illuminating the one or more light detectors with an auxiliary light source, wherein obtaining the second image is while the one or more light detectors are illuminated by the auxiliary light source.

12. The method of claim 11, wherein the auxiliary light source emits light at a source wavelength, and wherein the one or more light sources of the transmit block emit light at the source wavelength.

13. The method of claim 10, wherein obtaining the first image comprises:

obtaining the first image while: (i) the one or more light sources are emitting light at a source wavelength, and (ii) a light filter is positioned within a field-of-view of the camera, wherein the light filter attenuates light within a wavelength range that includes the source wavelength.

14. The method of claim 13, wherein obtaining the second image comprises obtaining the second image while the light filter is outside the field-of-view of the camera.

15. The method of claim 10, further comprising:

causing a plurality of light sources positioned along a periphery of a camera lens of the camera to emit light pulses toward the LIDAR device;

obtaining a third image using the camera, the third image indicating reflections of the emitted light pulses; and comparing the third image with a stored image, wherein adjusting the mounting position of the transmit block is further based on the comparison of the third image with the stored image.

16. The method of claim 10, further comprising:

actuating a plurality of probes toward the transmit block, wherein a given probe of the plurality is configured to detect contact between the given probe and the transmit block, and wherein adjusting the mounting position of the transmit block comprises causing an actuator to move the transmit block until at least two of the plurality of probes detect the transmit block at a same time.

17. A system comprising:

a mounting platform that mounts a light detection and ranging (LIDAR) device, wherein the LIDAR device includes a transmit block and a receive block, wherein the transmit block includes one or more light sources, wherein the receive block includes one or more light detectors;

a camera located at a given position outside the LIDAR device; and a controller that:

obtains a first image using the camera located at the given position outside the LIDAR device, wherein the first image is indicative of light source positions of the one or more light sources;

obtains a second image using the camera located at the given position outside the LIDAR device, wherein the second image is indicative of detector positions of the one or more light detectors;

compares the first image with the second image to determine separation between one or more pixels associated with a light source and one or more pixels associated with a corresponding light detector; and based on at least the comparison, determines an adjustment for a mounting position of at least one of the transmit block or the receive block in the LIDAR device.

18. The system of claim 17, further comprising:
an alignment apparatus that adjusts the mounting position based on the determined adjustment.

19. The system of claim 17, further comprising:
a light filter that attenuates light within a wavelength range including a source wavelength; and
an actuator coupled to the light filter, wherein the controller:
causes the actuator to move the light filter to a first position within a field-of-view of the camera such that the light filter is interposed between the camera and the one or more light sources; and
obtains the first image while the light filter is at the first position.

20. The system of claim 19, wherein the controller:
causes the actuator to move the light filter to a second position outside the field-of-view of the camera; and
obtains the second image while the light filter is at the second position.

* * * * *